US012737298B1

(12) United States Patent
Pimpalgaonkar et al.

(10) Patent No.: US 12,737,298 B1
(45) Date of Patent: Sep. 15, 2026

(54) OPTIMIZATION OF CACHED PERSISTENT VOLUMES IN CONTAINERIZED ENVIRONMENTS

(71) Applicant: International Business Machines Corporation, Armonk, NY (US)

(72) Inventors: Abhilasha Pimpalgaonkar, Pune (IN); Saurabh Sunil Wani, Pune (IN); Abhishek Jain, Baraut (IN); Shrutika Nipane, Kalyan East (IN); Deepak R. Ghuge, Ahmednagar (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 19/087,538

(22) Filed: Mar. 23, 2025

(51) Int. Cl.
*G06F 12/00* (2006.01)
*G06F 12/0871* (2016.01)

(52) U.S. Cl.
CPC .... *G06F 12/0871* (2013.01); *G06F 2212/604* (2013.01)

(58) Field of Classification Search
CPC ........................ G06F 12/0871; G06F 2212/604
See application file for complete search history.

(56) References Cited

U.S. PATENT DOCUMENTS 8,943,282 B1 * 1/2015 Armangau ............ G06F 16/128 711/126
9,645,932 B1 * 5/2017 Bono .................... G06F 3/0689
2017/0277467 A1 * 9/2017 Daloze .................. G06F 3/0604
2020/0092392 A1 3/2020 Seelam et al.
2021/0019400 A1 * 1/2021 Elgressy ............... G06F 9/5072
2024/0134526 A1 4/2024 Watson et al.
2024/0311257 A1 9/2024 Luan et al.

FOREIGN PATENT DOCUMENTS

WO 2024/102132 A1 5/2024

OTHER PUBLICATIONS

Bala Rameshbabu, "Sharing volumes between namespaces: Say hello to cross-namespace volume access", https://www.netapp.com/blog/astra-blg-sharing-volumes-between-namespaces-say-hello-to-cross-namespace-volume-access/, Nov. 5, 2022, 5 pages.

(Continued)

*Primary Examiner* — Mahesh H Dwivedi
(74) *Attorney, Agent, or Firm* — CHIP LAW GROUP

(57) ABSTRACT

Optimization of cached persistent volumes (PVs) is provided and includes receiving a first request for provisioning of a specific cached persistent volume (PV) within a first environment. The first request includes at least one specific directory path associated with a first dataset. A set of cached PVs is identified from a plurality of cached PVs based on a presence of a match between the first request and the set of cached PVs, and a sharing status associated with each cached PV of the plurality of cached PVs. A set of directory paths associated with the identified set of cached PVs is determined and a set of matching scores is generated based on the determined set of directory paths and the at least one specific directory path. An allocation of a cached PV of the set of cached PVs is controlled based on the generated set of matching scores.

20 Claims, 12 Drawing Sheets

(56) References Cited

OTHER PUBLICATIONS

Gero Schmidt, "Advanced Static Volume Provisioning with IBM Spectrum Scale on Red Hat OpenShift", https://community.ibm.com/community/user/blogs/gero-schmidt1/2022/04/01/advanced-static-volume-provisioning-on-ocp, Apr. 30, 2022, 68 pages.

Kang et al., "Dataset Placement and Data Loading Optimizations for Cloud-Native Deep Learning Workloads", 2023 IEEE 26th International Symposium on Real-Time Distributed Computing (ISORC), May 2023, 11 pages.

Koutsovasilis et al., "A Holistic Approach to Data Access for Cloud-Native Analytics and Machine Learning", 2021 IEEE 14th International Conference on Cloud Computing (CLOUD), Sep. 2021, 06 pages.

Sun et al., "Supercharge your auto scaling for generative AI inference—Introducing Container Caching in SageMaker Inference", https://aws.amazon.com/blogs/machine-learning/supercharge-your-auto-scaling-for-generative-ai-inference-introducing-container-caching-in-sagemaker-inference/, Dec. 2, 2024, 11 pages.

* cited by examiner

FIG. 2

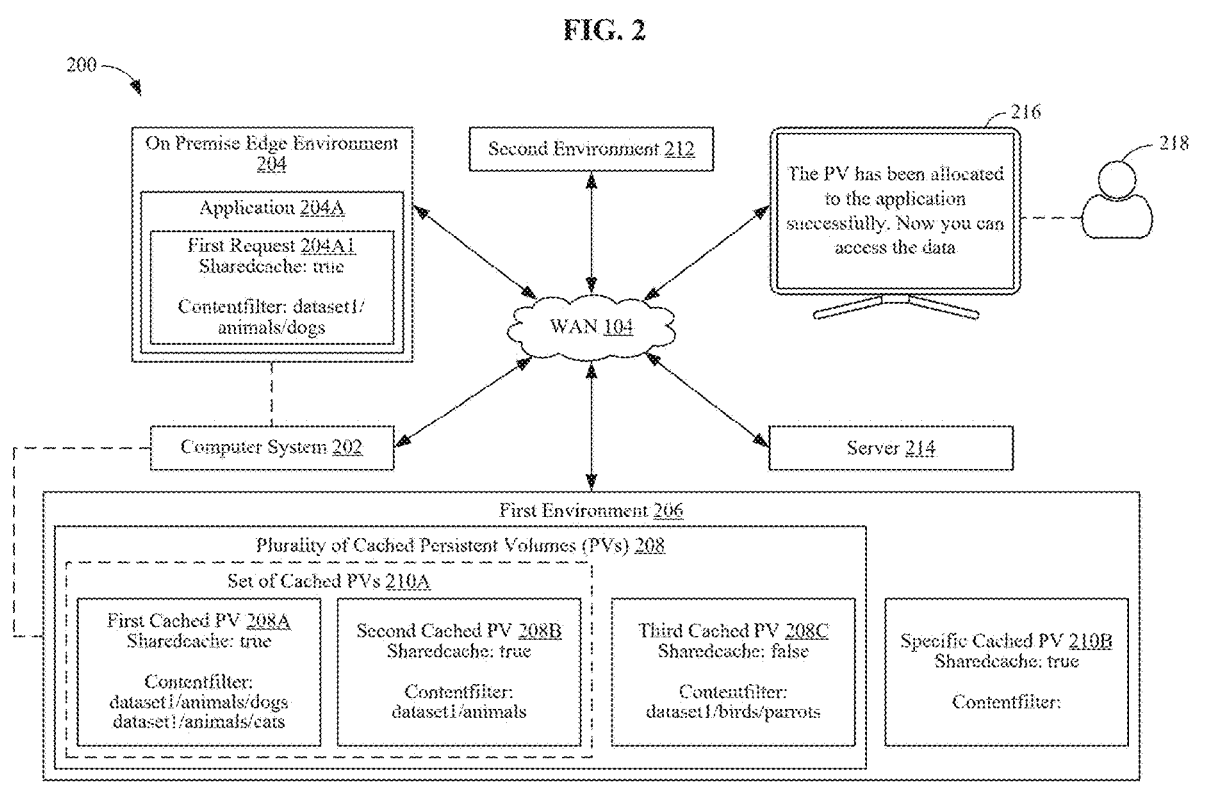

200
On Premise Edge Environment 204
Application 204A
First Request 204A1
Sharedcache: true
Contentfilter: dataset1/animals/dogs
Second Environment 212
216
The PV has been allocated to the application successfully. Now you can access the data
218
WAN 104
Computer System 202
Server 214
First Environment 206
Plurality of Cached Persistent Volumes (PVs) 208
Set of Cached PVs 210A
First Cached PV 208A
Sharedcache: true
Contentfilter: dataset1/animals/dogs dataset1/animals/cats
Second Cached PV 208B
Sharedcache: true
Contentfilter: dataset1/animals
Third Cached PV 208C
Sharedcache: false
Contentfilter: dataset1/birds/parrots
Specific Cached PV 210B
Sharedcache: true
Contentfilter:

Figure 5:
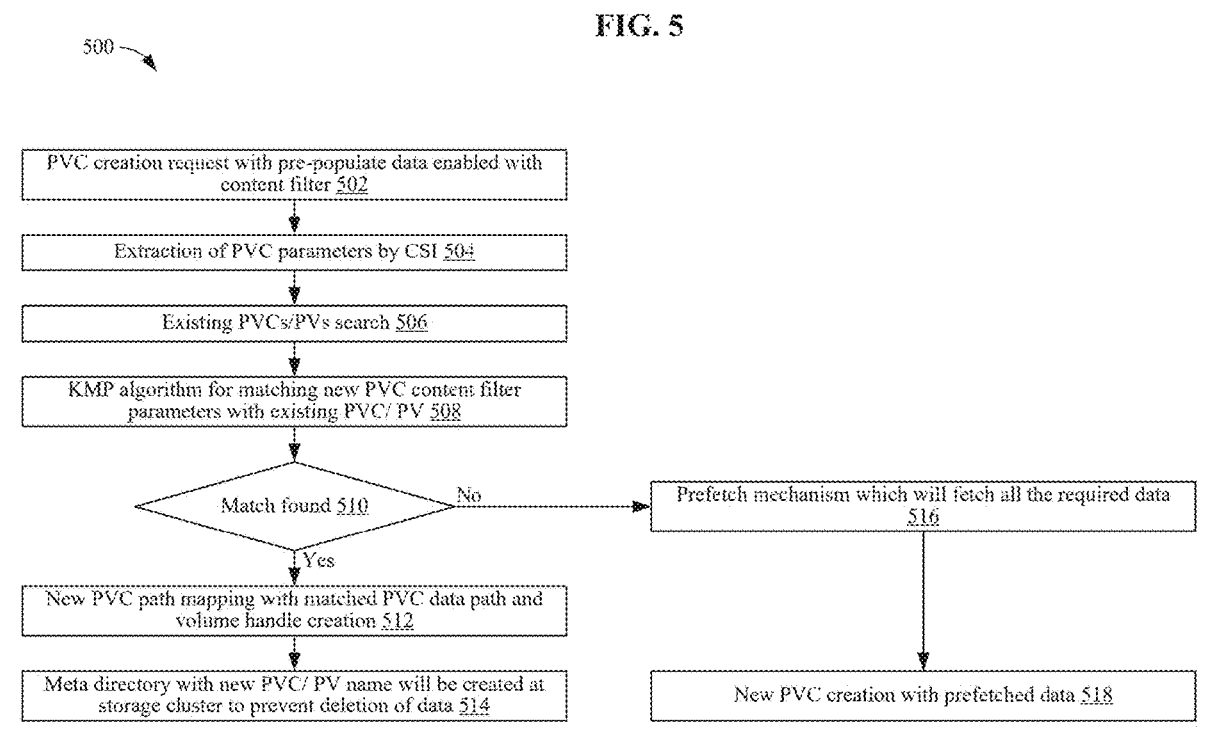

PVC creation request with pre-populate data enabled with content filter 502

Extraction of PVC parameters by CSI 504

Existing PVCs/PVs search 506

KMP algorithm for matching new PVC content filter parameters with existing PVC/ PV 508

Match found 510

No

Prefetch mechanism which will fetch all the required data 516

Yes

New PVC path mapping with matched PVC data path and volume handle creation 512

Meta directory with new PVC/ PV name will be created at storage cluster to prevent deletion of data 514

New PVC creation with prefetched data 518

OPTIMIZATION OF CACHED PERSISTENT VOLUMES IN CONTAINERIZED ENVIRONMENTS

BACKGROUND

The disclosure relates to containerization, and more particularly, to persistent volumes (PVs) in container platforms.

In recent years, containerization has emerged as a transformative technology in the field of software development and deployment. As organizations increasingly adopt cloud-native architectures, the need for efficient resource utilization, scalability, and rapid deployment has driven the popularity of container platforms. Containers encapsulate applications and dependencies of the applications, allowing the applications to run consistently across various environments. The consistency of the applications is vital for modern development practices, enabling teams to build, test, and deploy the applications with confidence, knowing that the applications will behave in the same way in production as the applications do in development.

Persistent volumes (PVs) are a critical aspect of containerization that addresses the need for durable and reliable storage in a cloud-native environment. A persistent volume (PV) is a piece of storage in the cluster that has been provisioned by an administrator or dynamically provisioned using storage classes. The PV is independent of the lifecycle of any individual container, meaning that data stored in a PV remains intact even if the container using the PV is deleted or recreated. The feature is critical for applications that need data persistence, such as databases, file storage, and various stateful services. These PVs can be used to manage storage resources efficiently, allowing for features like data replication, backup, and recovery. By abstracting the storage layer, the PVs enable developers to focus on application logic while ensuring that data is securely stored and easily accessible, thus enhancing the overall resilience and scalability of containerized applications.

SUMMARY

In various embodiments of the disclosure, a computer-implemented method for optimization of cached persistent volumes (PVs) in containerized environments is described. The computer-implemented method includes receiving, by a computer, a first request for provisioning of a specific cached persistent volume (PV) within a first environment. The first request includes at least one specific directory path associated with a first dataset. The first request is associated with obtaining the first dataset for an application from a second environment. The computer-implemented method further includes identifying, by the computer, a set of cached persistent volumes (PVs) from a plurality of cached PVs based on a presence of a match between the first request and the set of cached PVs, and a sharing status associated with each cached PV of the plurality of cached PVs. The sharing status indicates an availability of a respective cached PV of the plurality of cached PVs for allocation. The plurality of cached PVs is deployed in the first environment. The computer-implemented method further includes determining, by the computer, a set of directory paths associated with the identified set of cached PVs. Each directory path of the set of directory paths is indicative of a second dataset stored within each cached PV of the set of cached PVs in the first environment. Each cached PV of the identified set of cached PVs is associated with at least one directory path of the set of directory paths. The computer-implemented method further includes generating, by the computer, a set of matching scores for the set of cached PVs based on the determined set of directory paths and the at least one specific directory path associated with the first request. Each matching score of the set of matching scores is indicative of a degree of the match between the first request and a respective cached PV of the set of cached PVs. The computer-implemented method further includes controlling, by the computer, an allocation of a cached PV of the set of cached PVs to the application based on the generated set of matching scores.

In various embodiments of the disclosure, a computer system for optimization of cached persistent volumes (PVs) in containerized environments is described. The computer system includes a processor set, one or more computer-readable storage media, and program instructions stored on the one or more computer-readable storage media. The program instructions are executable by the processor set and cause the processor set to receive a first request for a provision of a specific cached persistent volume (PV) within a first environment. The first request includes at least one specific directory path associated with at least a first dataset. The first request is associated with a retrieval of the at least first dataset for an application from a second environment. The program instructions further cause the processor set to identify a set of cached persistent volumes (PVs) from a plurality of cached PVs based on a presence of a match between the first request and the set of cached PVs, and a sharing status associated with each cached PV of the plurality of cached PVs. The sharing status indicates an availability of a respective cached PV of the plurality of cached PVs for allocation. The plurality of cached PVs is deployed in the first environment. The program instructions further cause the processor set to determine a set of directory paths associated with the identified set of cached PVs. Each directory path of the set of directory paths is indicative of at least a second dataset stored within each cached PV of the set of cached PVs in the first environment. Each cached PV of the identified set of cached PVs is associated with at least one directory path of the set of directory paths. The program instructions further cause the processor set to generate a set of matching scores for the set of cached PVs based on the determined set of directory paths and the at least one specific directory path associated with the first request. Each matching score of the set of matching scores is indicative of a degree of the match between the first request and a respective cached PV of the set of cached PVs. The program instructions further cause the processor set to control an allocation of a cached PV of the set of cached PVs to the application based on the generated set of matching scores. The program instructions further cause the processor set to obtain a first portion of the at least first dataset from the cached PV of the set of cached PVs based on the degree of the match. The program instructions further cause the processor set to transmit the first portion of the at least first dataset to the application.

In various embodiments of the disclosure, a computer-program product controlling an allocation of a cached persistent volume (PV) to an application is described. The computer program product includes one or more computer-readable storage media and program instructions stored in the one or more computer-readable storage media to perform operations that include receiving a first request for provisioning of a specific cached PV within a first environment. The first request includes at least one specific directory path associated with a first dataset. The first request is associated with a retrieval of the first dataset for the application from a second environment. The operations further include identifying a set of cached persistent volumes (PVs) from a plurality of cached PVs based on a presence of a match between the first request and the set of cached PVs, and a sharing status associated with each cached PV of the plurality of cached PVs. The sharing status indicates an availability of a respective cached PV of the plurality of cached PVs for allocation. The plurality of cached PVs is deployed in the first environment. The operations further include determining a set of directory paths associated with the identified set of cached PVs. Each directory path of the set of directory paths is indicative of a second dataset stored within each cached PV of the set of cached PVs in the first environment. Each cached PV of the identified set of cached PVs is associated with at least one directory path of the set of directory paths. The operations further include generating a set of matching scores for the set of cached PVs based on the determined set of directory paths and the at least one specific directory path associated with the first request. Each matching score of the set of matching scores is indicative of a degree of the match between the first request and a respective cached PV of the set of cached PVs. The operations further include identifying a cached PV from the set of cached PVs based on the generated set of matching scores. A matching score associated with the identified cached PV is highest among the generated set of matching scores. The specific cached PV is excluded from the set of cached PVs. The operations further include controlling the allocation of the identified cached PV to the application based on the generated set of matching scores.

Additional technical features and benefits are realized through the techniques of the disclosure. Embodiments and aspects of the disclosure are described in detail herein and are considered a part of the claimed subject matter. For a better understanding, refer to the detailed description and the drawings.

BRIEF DESCRIPTION OF DRAWINGS

The following description will provide details of preferred embodiments with reference to the following figures, wherein:

FIG. 2 is a diagram that illustrates an environment for optimization of cached persistent volumes (PVs) in containerized environments, in accordance with an embodiment of the disclosure;

FIG. 5 is a diagram that illustrates a flowchart of a first exemplary method for optimization of cached persistent volumes (PVs) in containerized environments, in accordance with an embodiment of the disclosure;

DETAILED DESCRIPTION

Figure 1:
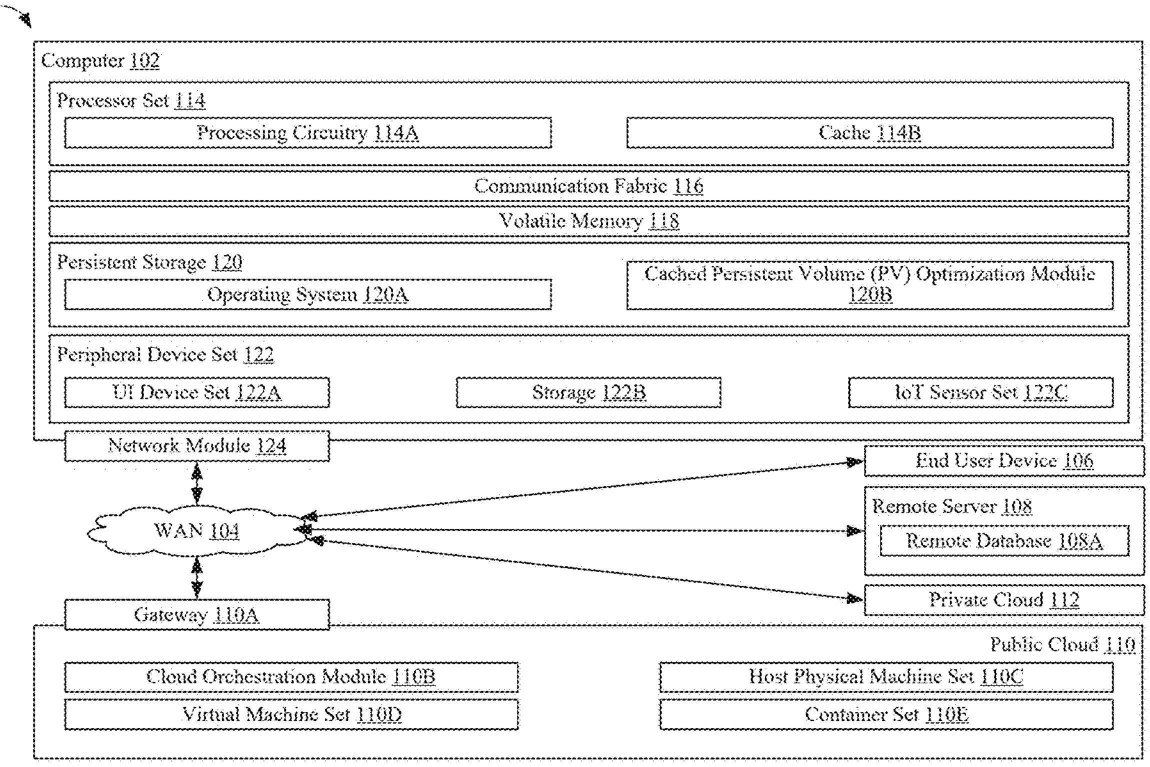
FIG. 1 is a diagram that illustrates a computing environment for the optimization of cached persistent volumes (PVs) in containerized environments, in accordance with an embodiment of the disclosure.

Containerization is a technology that has revolutionized software development and deployment in recent years. The demand for scalability, fast deployment, and effective resource allocation has brought this growth toward containerization as organizations have started embracing cloud-native architecture. Containers encapsulate applications and dependencies of the applications, allowing the applications to run consistently across various environments. The consistency of the applications is vital for modern development practices, enabling teams to build, test, and deploy the applications with confidence, knowing that the applications will behave the same way in production as the applications do in development.

Persistent volumes (PVs) are a critical aspect of containerization that addresses the need for durable and reliable storage in a cloud-native environment. A persistent volume (PV) is a piece of storage in the cluster that has been provisioned by an administrator or dynamically provisioned using storage classes. The PV is independent of the lifecycle of any individual container, meaning that data stored in a PV remains intact even if the container using the PV is deleted or recreated. The feature is critical for applications that need data persistence, such as databases, file storage, and various stateful services. These PVs can be used to manage storage resources efficiently, allowing for features like data replication, backup, and recovery. By abstracting the storage layer, the PVs enable developers to focus on application logic while ensuring that data is securely stored and easily accessible, thus enhancing the overall resilience and scalability of containerized applications.

These PVs play a critical role in various applications, particularly in fields that need substantial data storage and management. For instance, applications based on artificial intelligence (AI) and machine learning (ML) rely on large datasets that can reach thousands of gigabytes. The quality and volume of the data directly influence the accuracy and speed of algorithms, making it critical to have reliable storage solutions. In AI/ML operations, data is utilized across multiple stages, including training, testing, and validation, each requiring access to significant amounts of structured and unstructured data, such as audio and video files, large text documents, and more. By leveraging the persistent volumes (PVs), organizations can ensure that the data remains accessible and intact throughout the lifecycle of the applications, facilitating seamless data management and processing.

In addition to the AI and ML-based applications, these PVs are also vital for applications in fields such as data analytics, content management, and enterprise resource planning (ERP). These applications often generate and consume large volumes of data that need to be stored securely and accessed efficiently. For example, in data analytics, organizations may need to store historical data for trend analysis and reporting, while content management systems need persistent storage for user-generated content, images, and documents. By utilizing the persistent volumes (PVs), businesses can decouple the data storage from application containers, ensuring that data remains available even as applications are updated or scaled. The flexibility of the PVs allows organizations to adapt to changing business needs without compromising data integrity.

Furthermore, the ability to provision the persistent volumes (PVs) dynamically enhances the overall efficiency of application deployment and management. Organizations can implement automated scaling and resource allocation based on application demands, ensuring that storage resources are utilized properly. The adaptability is particularly beneficial in environments where applications experience variable workloads, such as e-commerce platforms during peak shopping seasons or financial services applications during market fluctuations. By providing a reliable and scalable storage solution, persistent volumes empower organizations to maintain performance and availability across a wide range of applications, ultimately driving innovation and improving operational efficiency.

However, the container technologies in edge environments face several challenges, primarily due to the limited storage capacity and the need for rapid data access. Edge environments often operate in resource-constrained settings where large datasets cannot be stored locally, making it difficult for applications to access the data they need in real-time. The limitation of resource-constrained settings can lead to increased latency and reduced performance, particularly for applications that need quick data retrieval, such as those in artificial intelligence (AI) and machine learning (ML).

To address these challenges, caching and cached persistent volumes (PVs) are implemented as effective solutions. Caching involves temporarily storing frequently accessed data closer to the applications, which significantly accelerates data access times. Cached persistent volumes (PVs) serve as a dedicated storage layer that retains this cached data, allowing applications to run efficiently even in environments where the original data resides in a central data lake (or central cloud storage). By leveraging the cached PVs, organizations can optimize resource utilization, reduce latency, and enhance the performance of their containerized applications in edge environments.

However, the provision of these cached persistent volumes (PVs) presents several challenges. One significant issue is the time-consuming nature of the data pre-fetching process. For instance, when data scientists or developers need to access specific datasets for their AI/ML models, the cached persistent volumes (PVs) must be pre-populated with the data before they can be mounted to the applications. Since the data needs to be prefetched from the central cloud environment before the allocation of the cached PVs, the pre-fetching of the data can take anywhere from a few minutes to several hours, which is particularly problematic in cloud or shared on-premises environments (edge environments) where every minute of GPU usage incurs costs. Due to the time-consuming nature of the prefetching from the central cloud environment, the processing time for the provision and allocation of the cached PVs is increased. Delays in data availability can further hinder experimentation and model training, ultimately affecting productivity and increasing operational expenses.

Additionally, the potential for redundant data storage across multiple cached persistent volumes (PVs) is also a challenge in the edge environments which leads to wastage of storage resources, and these storage resources are critical in the edge environments since only limited storage resources are available. For instance, in edge environments, data scientists may experiment with similar datasets, leading to scenarios where the same data is cached in different persistent volumes (PVs) across various namespaces. For instance, if multiple teams are working with a dataset related to a specific category, such as animals, the duplication of cached data can become a costly affair, especially when dealing with large datasets that can be greater than even 1000 GB. The redundancy of the data not only wastes storage resources but also complicates data management, as teams may struggle to keep track of which cached persistent volumes (PVs) contain the most relevant or up-to-date information.

Further, since the data needs to be obtained from the central cloud environment again and again for the prepopulation of the cached PV, the bandwidth resources are compromised. Hence, obtaining such a large amount of data from the central cloud environment for prepopulating the cached PV increases the processing time for the provision and allocation of cached PVs, leads to the wastage of storage resources, and further increases the bandwidth of the network through which the data is obtained. Therefore, there is a need for an improved solution for the provision and allocation of the cached persistent volumes (PVs) to solve the problems discussed above.

The disclosed system provides an improved way to provision and the allocation of cached persistent volumes (PVs) within containerized environments. In some embodiments, the disclosed system determines a presence of a match between the data requested for pre-population of a cached PV and the data stored within the existing cached PVs that are currently allocated or are currently prepopulated with some data. The disclosed system determines the presence of the match with only the existing cached PVs that agree to share the data with the users (authorized users that are authorized using security parameters). In some embodiments, the disclosed system further generates a set of matching scores for the existing cached PVs based on a degree of the match between the requested data and the data stored within the existing cached PVs. The disclosed system further selects a cached PV from the existing cached PVs, that has the highest matching score among the generated set of matching scores. Hence, the disclosed system selects the cached PV from the existing cached PVs that have the highest probability of having the data that is needed by the request.

In some embodiments, the disclosed system further maps the selected cached PV with the request and controls the allocation of the selected cached PV to the request. Hence, the disclosed system eliminates the need for allocating a new cached PV for the request and further eliminates the need for obtaining the data from the central cloud environment for pre-populating the new cached PV. In this manner, the disclosed system reduces the processing time for the provisioning and allocation of the cached PVs within containerized environments since the disclosed system eliminates the need for obtaining the data for the pre-population of the new cached PV from the central cloud environment.

In an embodiment, the disclosed system further reduces the wastage of storage resources within the edge environments or cloud environments by eliminating the need for allocating a new cached PV for the request. Instead of allocating the new cached PV, the disclosed system allocates the existing cached PV that has the highest matching score with the request, among the set of matching scores. In an embodiment, the disclosed system further reduces the bandwidth of the network since the disclosed system eliminates the need for obtaining the data from the central cloud environment. Instead of obtaining the data from the central cloud environment, the disclosed system maps the request with the data present within the existing cached PV that has the highest matching score with the request, among the generated set of matching scores.

The disclosed system can be implemented as a value-added service for organizations where users can be authorized using security credentials to share data and share the cached PVs with their peers. By ensuring that only the authorized users are granted access to share the data and use the shared data and shared storage, the disclosed system addresses the privacy concern of the organizations. Further, by allowing the use of the shared storage, the disclosed system saves a significant amount of cost for the organization that the organization spends for the storage resources within these edge environments.

In various embodiments of the disclosure, a computer-implemented method for optimization of cached persistent volumes (PVs) in containerized environments is described. The computer-implemented method includes receiving, by a computer, a first request for provisioning of a specific cached persistent volume (PV) within a first environment. The first request includes at least one specific directory path associated with a first dataset. The first request is associated with obtaining the first dataset for an application from a second environment. The computer-implemented method further includes identifying, by the computer, a set of cached persistent volumes (PVs) from a plurality of cached PVs based on a presence of a match between the first request and the set of cached PVs, and a sharing status associated with each cached PV of the plurality of cached PVs. The sharing status indicates an availability of a respective cached PV of the plurality of cached PVs for allocation. The plurality of cached PVs is deployed in the first environment. The computer-implemented method further includes determining, by the computer, a set of directory paths associated with the identified set of cached PVs. Each directory path of the set of directory paths is indicative of a second dataset stored within each cached PV of the set of cached PVs in the first environment. Each cached PV of the identified set of cached PVs is associated with at least one directory path of the set of directory paths. The computer-implemented method further includes generating, by the computer, a set of matching scores for the set of cached PVs based on the determined set of directory paths and the at least one specific directory path associated with the first request. Each matching score of the set of matching scores is indicative of a degree of the match between the first request and a respective cached PV of the set of cached PVs. The computer-implemented method further includes controlling, by the computer, an allocation of a cached PV of the set of cached PVs to the application based on the generated set of matching scores. Instead of allocating the specific cached PV (a new cached PV) within the first environment, the disclosed computer-implemented method controls the allocation of the existing cached PV (the cached PV of the set of cached PVs) that has the highest matching score, among the generated set of matching score, with the first request. By allocating the existing cached PV, the disclosed computer-implemented method eliminates the need for pre-populating the new cached PV and obtaining the first dataset from the second environment, for the allocation. Hence, the disclosed computer-implemented method reduces the processing time for the allocation of the cached PV by eliminating the need for obtaining the first dataset from the second environment. The disclosed computer-implemented method further reduces the wastage of the storage resources within the first environment by eliminating the need for allocating the new cached PV. The disclosed computer-implemented method further reduces the bandwidth of the network by eliminating the need for obtaining the first dataset from the second environment.

In various embodiments of the disclosure, the computer-implemented method further includes identifying, by the computer, the cached PV from the set of cached PVs based on the generated set of matching scores. A matching score associated with the identified cached PV is highest among the generated set of matching scores. The specific cached PV is excluded from the set of cached PVs. The computer-implemented method further includes controlling, by the computer, the allocation of the identified cached PV to the application. The disclosed computer-implemented method selects the cached PV from the set of cached PVs that has the highest matching score, among the set of matching scores, for allocation with the first request. The disclosed computer-implemented method controls the allocation of only the cached PV that has the best probability of matching the needs of the application, among the plurality of cached PVs. Hence, the disclosed computer-implemented method reduces the possibility of errors in the functionality of the application since only the selected cached PV, which has the data that matches the needs of the application, is mapped with the first request.

In various embodiments of the disclosure, the computer-implemented method further includes generating, by the computer, a meta-directory indicative of one or more applications associated with the identified cached PV. The application is included in the one or more applications. The computer-implemented method further includes controlling, by the computer, a deletion of the second dataset within the identified cached PV based on the meta-directory. The disclosed computer-implemented method further maintains the records of the one or more applications that are using the second dataset present within the identified cached PV in the form of the meta-directory. The disclosed computer-implemented method further controls the deletion of the second dataset using the meta-directory, ensuring that the second dataset is deleted only in case no one is using the second dataset and preventing a sudden deletion of the second dataset. Hence, the disclosed computer-implemented method reduces the possibility of errors in the functionality of each application of the one or more applications, which are utilizing the second dataset.

In various embodiments of the disclosure, the computer-implemented method further includes obtaining, by the computer, a first portion of the first dataset from the identified cached PV based on the degree of the match. The computer-implemented method further includes transmitting, by the computer, the first portion of the first dataset to the application. In case of partial matching, the disclosed computer-implemented method still maps the identified cached PV with the first request. The disclosed computer-implemented method obtains the first portion of the first dataset from the identified cached PV and transmits the first portion to the application so that the application can at least start the functioning (e.g. can start training the models if needed) and not wait for the entire first dataset to be obtained from the second environment. Hence, the disclosed computer-implemented method reduces the possibility of delays or idle time in the functioning of the application (e.g. reduces the possibility of idle time before starting the training of the models).

In various embodiments of the disclosure, the computer-implemented method further includes obtaining, by the computer, a second portion of the first dataset from the second environment based on the degree of the match. The second portion is different from the first portion. The computer-implemented method further includes transmitting, by the computer, the second portion of the first dataset to the application. In case of partial matching, the disclosed computer-implemented method obtains only the second portion of the first dataset from the second environment, which may not be present within the identified cached PV. Hence, the disclosed computer-implemented method reduces the amount of the data that needs to be obtained from the second environment, thereby reducing the bandwidth of the network used for obtaining the data.

In various embodiments of the disclosure, the sharing status associated with each cached PV of the identified set of cached PVs is enabled. The disclosed computer-implemented method searches only for the existing cached PVs that have the sharing status enabled, thereby reducing a searching pool for searching through the existing cached PVs. Hence, by reducing the searching pool, the disclosed computer-implemented method reduces the processing time for the identification of the cached PV that can be mapped with the first request, thereby reducing the overall processing time for the allocation of the identified cached PV.

In various embodiments of the disclosure, the computer-implemented method further includes determining, by the computer, a plurality of directory paths associated with the plurality of cached PVs. The set of directory paths is included in the plurality of directory paths. The specific cached PV is excluded from the plurality of cached PVs. The computer-implemented method further includes applying, by the computer, a pattern-matching operation to the plurality of directory paths and the at least one specific directory path associated with the first request. The computer-implemented method further includes determining, by the computer, the presence of the match between each cached PV of the set of cached PVs and the first request based on the application of the pattern-matching operation to the plurality of directory paths and the at least one specific directory path associated with the first request. The computer-implemented method further includes identifying, by the computer, the set of cached PVs from the plurality of cached PVs based on the determination of the presence of the match. The disclosed computer-implemented method identifies only the set of cached PVs from the plurality of cached PVs that stores the dataset which has the presence of the match with the first dataset associated with the first request so that the dataset is useful for the application for performing the functionalities. Hence, by ensuring that only the set of cached PVs that have the presence of the match with the first request are considered for allocation, the disclosed computer-implemented method reduces the possibility of errors in the functionality of the application.

In various embodiments of the disclosure, the computer-implemented method further includes determining, by the computer, a first set of security parameters associated with the first request. The computer-implemented method further includes determining, by the computer, a second set of security parameters associated with the first environment. The computer-implemented method further includes authorizing, by the computer, the first request based on the first set of security parameters and the second set of security parameters. The authorization includes comparing the first set of security parameters with the second set of security parameters. The computer-implemented method further includes controlling, by the computer, the allocation of the cached PV of the set of cached PVs to the application based on the authorization. By authorizing the first request using the first set of security parameters and the second set of security parameters, the disclosed computer-implemented method ensures that only authorized users who have the critical security credentials are allowed to utilize the data within the existing cached PVs. Hence, the disclosed computer-implemented method addresses potential security threats and prevents potential security attacks.

In various embodiments of the disclosure, the computer-implemented method further includes receiving, by the computer, a second request associated with a modification of the sharing status. The computer-implemented method further includes determining, by the computer, a first set of security parameters associated with the received second request. The computer-implemented method further includes determining, by the computer, a second set of security parameters associated with the first environment. The computer-implemented method further includes authorizing, by the computer, the received second request based on the first set of security parameters and the second set of security parameters. The authorization includes comparing the first set of security parameters with the second set of security parameters. The computer-implemented method further includes modifying, by the computer, the sharing status based on the authorization. The modification corresponds to one of modifying the sharing status from disabled to enabled or modifying the sharing status from enabled to disabled. By authorizing the second request using the first set of security parameters and the second set of security parameters, the disclosed computer-implemented method ensures that only authorized users who have the critical security credentials are allowed to modify the sharing status of the existing cached PVs. Hence, the disclosed computer-implemented method addresses potential security threats and prevents potential security attacks, preventing unauthorized users from modifying the sharing status.

In various embodiments of the disclosure, the computer-implemented method further includes applying, by the computer, a pattern-matching operation to the determined set of directory paths and the at least one specific directory path associated with the first request. The computer-implemented method further includes generating, by the computer, the set of matching scores based on the application of the pattern-matching operation to the determined set of directory paths and the at least one specific directory path associated with the first request. Instead of generating the set of matching scores for each cached PV of the plurality of cached PVs, the disclosed computer-implemented method generates the set of matching scores for only the identified set of cached PVs that have the presence of the match with the first request.

Hence, the disclosed computer-implemented method reduces the processing time for the generation of the set of matching scores by eliminating the need for generating the matching scores for each cached PV of the plurality of cached PVs, thereby reducing the overall processing time for the allocation of the cached PV.

In various embodiments of the disclosure, a computer system for optimization of cached persistent volumes (PVs) in containerized environments is described. The computer system includes a processor set, one or more computer-readable storage media, and program instructions stored on the one or more computer-readable storage media. The program instructions are executable by the processor set and cause the processor set to receive a first request for a provision of a specific cached persistent volume (PV) within a first environment. The first request includes at least one specific directory path associated with at least a first dataset. The first request is associated with a retrieval of the at least first dataset for an application from a second environment. The program instructions further cause the processor set to identify a set of cached persistent volumes (PVs) from a plurality of cached PVs based on a presence of a match between the first request and the set of cached PVs, and a sharing status associated with each cached PV of the plurality of cached PVs. The sharing status indicates an availability of a respective cached PV of the plurality of cached PVs for allocation. The plurality of cached PVs is deployed in the first environment. The program instructions further cause the processor set to determine a set of directory paths associated with the identified set of cached PVs. Each directory path of the set of directory paths is indicative of at least a second dataset stored within each cached PV of the set of cached PVs in the first environment. Each cached PV of the identified set of cached PVs is associated with at least one directory path of the set of directory paths. The program instructions further cause the processor set to generate a set of matching scores for the set of cached PVs based on the determined set of directory paths and the at least one specific directory path associated with the first request. Each matching score of the set of matching scores is indicative of a degree of the match between the first request and a respective cached PV of the set of cached PVs. The program instructions further cause the processor set to control an allocation of a cached PV of the set of cached PVs to the application based on the generated set of matching scores. The program instructions further cause the processor set to obtain a first portion of the at least first dataset from the cached PV of the set of cached PVs based on the degree of the match. The program instructions further cause the processor set to transmit the first portion of the at least first dataset to the application. Instead of allocating the specific cached PV (a new cached PV) within the first environment, the disclosed computer system controls the allocation of the existing cached PV (the cached PV of the set of cached PVs) that has the highest matching score, among the generated set of matching score, with the first request. By allocating the existing cached PV, the disclosed computer system eliminates the need for pre-populating the new cached PV and obtaining the at least first dataset from the second environment, for the allocation. Hence, the disclosed computer system reduces the processing time for the allocation of the cached PV by eliminating the need for obtaining the first dataset from the second environment. The disclosed computer system further reduces the wastage of the storage resources within the first environment by eliminating the need for allocating the new cached PV. The disclosed computer system further reduces the bandwidth of the network by eliminating the need for obtaining the at least first dataset from the second environment. Further, in case of partial matching, the disclosed computer system still maps the existing cached PV with the first request. The disclosed computer system obtains the first portion of the at least first dataset from the identified cached PV and transmits the first portion to the application so that the application can at least start the functioning (e.g. can start training the models if needed) and not wait for the entire at least first dataset to be obtained from the second environment. Hence, the disclosed computer system reduces the possibility of delays or idle time in the functioning of the application (e.g. reduces the possibility of idle time before starting the training of the models).

In various embodiments of the disclosure, the program instructions further cause the processor set to identify the cached PV from the set of cached PVs based on the generated set of matching scores. A matching score associated with the identified cached PV is highest among the generated set of matching scores. The specific cached PV is excluded from the set of cached PVs. The program instructions further cause the processor set to control the allocation of the identified cached PV to the application. The disclosed computer system selects the cached PV from the set of cached PVs that has the highest matching score, among the set of matching scores, for allocation with the first request. The disclosed computer system controls the allocation of only the cached PV that has the best probability of matching the needs of the application, among the plurality of cached PVs. Hence, the disclosed computer system reduces the possibility of errors in the functionality of the application since only the selected cached PV, which has the data that matches the needs of the application, is mapped with the first request.

In various embodiments of the disclosure, the program instructions further cause the processor set to generate a meta-directory indicative of one or more applications associated with the identified cached PV. The application is included in the one or more applications. The program instructions further cause the processor set to control a deletion of the at least second dataset within the identified cached PV based on the meta-directory. The disclosed computer system further maintains the records of the one or more applications that are using the at least second dataset present within the identified cached PV in the form of the meta-directory. The disclosed computer system further controls the deletion of the at least second dataset using the meta-directory, ensuring that the at least second dataset is deleted only in case no one is using the at least second dataset and preventing a sudden deletion of the at least second dataset. Hence, the disclosed computer system reduces the possibility of errors in the functionality of each application of the one or more applications, which are utilizing the at least second dataset.

In various embodiments of the disclosure, the program instructions further cause the processor set to obtain a second portion of the at least first dataset from the second environment based on the degree of the match. The second portion is different from the first portion. The program instructions further cause the processor set to transmit the second portion of the at least first dataset to the application. In case of partial matching, the disclosed computer system obtains only the second portion of the at least first dataset from the second environment, which may not be present within the identified cached PV. Hence, the disclosed computer system reduces the amount of the data that needs to be obtained from the second environment, thereby reducing the bandwidth of the network used for obtaining the data.

In various embodiments of the disclosure, the program instructions further cause the processor set to determine a plurality of directory paths associated with the plurality of cached PVs. The set of directory paths is included in the plurality of directory paths. The specific cached PV is excluded from the plurality of cached PVs. The program instructions further cause the processor set to apply a pattern-matching operation to the plurality of directory paths and the at least one specific directory path associated with the first request. The program instructions further cause the processor set to determine the presence of the match between each cached PV of the set of cached PVs and the first request based on the application of the pattern-matching operation to the plurality of directory paths and the at least one specific directory path associated with the first request. The program instructions further cause the processor set to identify the set of cached PVs from the plurality of cached PVs based on the determination of the presence of the match. The disclosed computer system identifies only the set of cached PVs from the plurality of cached PVs that stores the dataset that has the presence of the match with the first dataset associated with the first request so that the dataset is useful for the application for performing the functionalities. Hence, by ensuring that only the set of cached PVs that have the presence of the match with the first request are considered for allocation, the disclosed computer system reduces the possibility of errors in the functionality of the application.

In various embodiments of the disclosure, the sharing status associated with each cached PV of the identified set of cached PVs is enabled. The disclosed computer system searches only for the existing cached PVs that have the sharing status enabled, thereby reducing a searching pool for searching through the existing cached PVs. Hence, by reducing the searching pool, the disclosed computer system reduces the processing time for the identification of the cached PV that can be mapped with the first request, thereby reducing the overall processing time for the allocation of the identified cached PV.

In various embodiments of the disclosure, the program instructions further cause the processor set to determine a first set of security parameters associated with the first request. The program instructions further cause the processor set to determine a second set of security parameters associated with the first environment. The program instructions further cause the processor set to authorize the first request based on the first set of security parameters and the second set of security parameters. The authorization is based on a comparison of the first set of security parameters and the second set of security parameters. The program instructions further cause the processor set to control the allocation of the cached PV of the set of cached PVs to the application based on the authorization. By authorizing the first request using the first set of security parameters and the second set of security parameters, the disclosed computer system ensures that only authorized users who have the critical security credentials are allowed to utilize the data within the existing cached PVs. Hence, the disclosed computer system addresses potential security threats and prevents potential security attacks.

In various embodiments of the disclosure, the program instructions further cause the processor set to receive a second request associated with a modification of the sharing status. The program instructions further cause the processor set to determine a first set of security parameters associated with the second request. The program instructions further cause the processor set to determine a second set of security parameters associated with the first environment. The program instructions further cause the processor set to authorize the second request based on the first set of security parameters and the second set of security parameters. The authorization is based on a comparison of the first set of security parameters and the second set of security parameters. The program instructions further cause the processor set to modify the sharing status based on the authorization. The modification corresponds to one of modifying the sharing status from disabled to enabled or modifying the sharing status from enabled to disabled. By authorizing the second request using the first set of security parameters and the second set of security parameters, the disclosed computer system ensures that only authorized users who have the critical security credentials are allowed to modify the sharing status of the existing cached PVs. Hence, the disclosed computer system addresses potential security threats and prevents potential security attacks, preventing unauthorized users from modifying the sharing status.

In various embodiments of the disclosure, the program instructions further cause the processor set to apply a pattern-matching operation to the determined set of directory paths and the at least one specific directory path associated with the first request. The program instructions further cause the processor set to generate the set of matching scores based on the application of the pattern-matching operation to the determined set of directory paths and the at least one specific directory path associated with the first request. Instead of generating the set of matching scores for each cached PV of the plurality of cached PVs, the disclosed computer system generates the set of matching scores for only the identified set of cached PVs that have the presence of the match with the first request. Hence, the disclosed computer system reduces the processing time for the generation of the set of matching scores by eliminating the need for generating the matching scores for each cached PV of the plurality of cached PVs, thereby reducing the overall processing time for the allocation of the cached PV.

In various embodiments of the disclosure, a computer-program product controlling an allocation of a cached persistent volume (PV) to an application is described. The computer program product includes one or more computer-readable storage media and program instructions stored in the one or more computer-readable storage media to perform operations that include receiving a first request for provisioning of a specific cached PV within a first environment. The first request includes at least one specific directory path associated with a first dataset. The first request is associated with a retrieval of the first dataset for the application from a second environment. The operations further include identifying a set of cached persistent volumes (PVs) from a plurality of cached PVs based on a presence of a match between the first request and the set of cached PVs, and a sharing status associated with each cached PV of the plurality of cached PVs. The sharing status indicates an availability of a respective cached PV of the plurality of cached PVs for allocation. The plurality of cached PVs is deployed in the first environment. The operations further include determining a set of directory paths associated with the identified set of cached PVs. Each directory path of the set of directory paths is indicative of a second dataset stored within each cached PV of the set of cached PVs in the first environment. Each cached PV of the identified set of cached PVs is associated with at least one directory path of the set of directory paths. The operations further include generating a set of matching scores for the set of cached PVs based on the determined set of directory paths and the at least one specific directory path associated with the first request. Each matching score of the set of matching scores is indicative of a degree of the match between the first request and a respective cached PV of the set of cached PVs. The operations further include identifying a cached PV from the set of cached PVs based on the generated set of matching scores. A matching score associated with the identified cached PV is highest among the generated set of matching scores. The specific cached PV is excluded from the set of cached PVs. The operations further include controlling the allocation of the identified cached PV to the application based on the generated set of matching scores. Instead of allocating the specific cached PV (a new cached PV) within the first environment, the disclosed computer-program product controls the allocation of the existing cached PV (the identified cached PV) that has the highest matching score, among the generated set of matching score, with the first request. By allocating the existing cached PV, the disclosed computer-program product eliminates the need for pre-populating the new cached PV and obtaining the first dataset from the second environment, for the allocation. Hence, the disclosed computer-program product reduces the processing time for the allocation of the cached PV by eliminating the need for obtaining the first dataset from the second environment. The disclosed computer-program product further reduces the wastage of the storage resources within the first environment by eliminating the need for allocating the new cached PV. The disclosed computer-program product further reduces the bandwidth of the network by eliminating the need for obtaining the first dataset from the second environment.

Various aspects of the disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks are performed in reverse order, as a single integrated operation, concurrently, or in a manner at least partially overlapping in time.

A computer program product embodiment ("CPP embodiment" or "CPP") is a term used in the disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage media is an electronic storage media, a magnetic storage media, an optical storage media, an electromagnetic storage media, a semiconductor storage media, a mechanical storage media, or any suitable combination of the foregoing. Some known types of storage devices that include these mediums include diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage media or mediums, as that term is used in the disclosure, is not to be construed as storage in the form of transitory signals per se, such as radio waves or various freely propagating electromagnetic waves, electromagnetic waves propagating through a waveguide, light pulses passing through a fiber optic cable, electrical signals communicated through a wire, and/or various transmission media. As will be understood by those of skill in the art, data is typically moved at some occasional points in time during normal operations of a storage device, such as during access, de-fragmentation, or garbage collection, but this does not render the storage device as transitory because the data is not transitory while stored.

FIG. 1 is a diagram that illustrates a computing environment for the optimization of cached persistent volumes (PVs) in containerized environments, in accordance with an embodiment of the disclosure. With reference to FIG. 1, there is shown a computing environment 100 that contains an example of an environment for the execution of at least some of the computer code involved in performing the disclosed methods, such as a cached persistent volume (PV) optimization module 120B. In addition to the cached persistent volume (PV) optimization module 120B, computing environment 100 includes, for example, a computer 102, a wide area network (WAN) 104, an end user device (EUD) 106, a remote server 108, a public cloud 110, and a private cloud 112. In this embodiment of the disclosure, the computer 102 includes a processor set 114 (including a processing circuitry 114A and a cache 114B), a communication fabric 116, a volatile memory 118, a persistent storage 120 (including an operating system 120A and the cached persistent volume (PV) optimization module 120B, as identified above), a peripheral device set 122 (including a user interface (UI) device set 122A, a storage 122B, and an Internet of Things (IoT) sensor set 122C), and a network module 124. The remote server 108 includes a remote database 108A. The public cloud 110 includes a gateway 110A, a cloud orchestration module 110B, a host physical machine set 110C, a virtual machine set 110D, and a container set 110E.

The computer 102 may take the form of a desktop computer, a laptop computer, a tablet computer, a smartphone, a smartwatch or a wearable computer, a mainframe computer, a quantum computer, or any various forms of a computer or a mobile device now known or to be developed in the future that can run a program, access a network or query a database, such as the remote database 108A. As is well understood in the art of computer technology, and depending upon the technology, the performance of a computer-implemented method may be distributed among multiple computers and/or between multiple locations. In this presentation of the computing environment 100, detailed discussion is focused on a single computer, specifically the computer 102, to keep the presentation as simple as possible. The computer 102 may be located in a cloud, even though not shown in a cloud in FIG. 1.

The processor set 114 includes one, or more, computer processors of any type now known or to be developed in the future. The processing circuitry 114A may be distributed over multiple packages, for example, multiple, coordinated integrated circuit chips. The processing circuitry 114A may implement multiple processor threads and/or multiple processor cores. The cache 114B is a memory that is located in the processor chip package(s) and is typically used for data or code that should be available for rapid access by the threads or cores running on the processor set 114. Cache memories are typically organized into multiple levels depending upon relative proximity to the processing circuitry 114A. Alternatively, some, or all, of the cache 114B for the processor set 114 may be located "off-chip." In some computing environments, the processor set 114 may be designed for working with qubits and performing quantum computing.

Computer readable program instructions are typically loaded onto the computer 102 to cause a series of operations to be performed by the processor set 114 of the computer 102 and thereby effect a computer-implemented method, such that the instructions thus executed will instantiate the methods specified in flowcharts and/or narrative descriptions of computer-implemented methods included in this document (collectively referred to as "the disclosed methods"). These computer-readable program instructions are stored in various types of computer-readable storage media, such as the cache 114B and the various storage media discussed below. The program instructions, and associated data, are accessed by the processor set 114 to control and direct the performance of the disclosed methods. In computing environment 100, at least some of the instructions for performing the disclosed methods may be stored in the dynamic modification of the cached persistent volume (PV) optimization module 120B in persistent storage 120.

The communication fabric 116 is the signal conduction path that allows the various components of the computer 102 to communicate with each other. Typically, this fabric is made of switches and electrically conductive paths, such as the switches and electrically conductive paths that make up buses, bridges, physical input/output ports, and the like. Various types of signal communication paths are used, such as fiber optic communication paths and/or wireless communication paths.

The volatile memory 118 is any type of volatile memory now known or to be developed in the future. Examples include dynamic type random access memory (RAM) or static type RAM. Typically, the volatile memory 118 is characterized by random access, but this is not needed unless affirmatively indicated. In the computer 102, the volatile memory 118 is located in a single package and is internal to the computer 102, but alternatively or additionally, the volatile memory 118 may be distributed over multiple packages and/or located externally with respect to the computer 102.

The persistent storage 120 is any form of non-volatile storage for computers that is now known or to be developed in the future. The non-volatility of this storage means that the stored data is maintained regardless of whether power is being supplied to the computer 102 and/or directly to the persistent storage 120. The persistent storage 120 is a read-only memory (ROM), but typically at least a portion of the persistent storage 120 allows the writing of data, deletion of data, and re-writing of data. Some familiar forms of the persistent storage 120 include magnetic disks and solid-state storage devices. The operating system 120A may take several forms, such as various known proprietary operating systems or open-source Portable Operating System Interface-type operating systems that employ a kernel. The code included in the cached persistent volume (PV) optimization module 120B typically includes at least some of the computer code involved in performing the disclosed methods.

The peripheral device set 122 includes the set of peripheral devices of the computer 102. Data communication connections between the peripheral devices and the various components of the computer 102 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments of the disclosure, the UI device set 122A includes components such as a display screen, speaker, microphone, wearable devices (such as goggles and smartwatches), keyboard, mouse, printer, touchpad, game controllers, and haptic devices. The storage 122B is external storage, such as an external hard drive, or insertable storage, such as an SD card. The storage 122B is persistent and/or volatile. In some embodiments of the disclosure, the storage 122B may take the form of a quantum computing storage device for storing data in the form of qubits. In embodiments of the disclosure where the computer 102 is needed to have a large amount of storage (for example, where the computer 102 locally stores and manages a large database) then this storage may be provided by peripheral storage devices designed for storing very large amounts of data, such as a storage area network (SAN) that is shared by multiple, geographically distributed computers. The IoT sensor set 122C is made up of sensors that can be used in Internet of Things applications. For example, a first sensor may be a thermometer, and a second sensor may be a motion detector.

The network module 124 is the collection of computer software, hardware, and firmware that allows the computer 102 to communicate with various computers through the WAN 104. The network module 124 may include hardware, such as modems or Wi-Fi signal transceivers, software for packetizing and/or de-packetizing data for communication network transmission, and/or web browser software for communicating data over the internet. In some embodiments of the disclosure, network control functions, and network forwarding functions of the network module 124 are performed on the same physical hardware device. In various embodiments of the disclosure (for example, embodiments that utilize software-defined networking (SDN)), the control functions and the forwarding functions of the network module 124 are performed on physically separate devices, such that the control functions manage several different network hardware devices. Computer-readable program instructions for performing the disclosed methods can typically be downloaded to the computer 102 from an external computer or external storage device through a network adapter card or network interface included in the network module 124.

The WAN 104 is any wide area network (for example, the internet) for communicating computer data over non-local distances by any technology for communicating computer data, now known or to be developed in the future. In some embodiments of the disclosure, the WAN 104 may be replaced and/or supplemented by local area networks (LANs) designed to communicate data between devices located in a local area, such as a Wi-Fi network. The WAN 104 and/or LANs typically include computer hardware such as copper transmission cables, optical transmission fibers, wireless transmission, routers, firewalls, switches, gateway computers, and edge servers.

The EUD 106 is any computer system that is used and controlled by an end user (for example, a customer of an enterprise that operates the computer 102) and may take any of the forms discussed above in connection with the computer 102. The EUD 106 typically receives helpful and useful data from the operations of the computer 102. For example, in a hypothetical case where the computer 102 is designed to provide a recommendation to an end user, this recommendation would typically be communicated from the network module 124 of the computer 102 through the WAN 104 to the EUD 106. In this way, the EUD 106 can display, or otherwise present recommendations to an end user. In some embodiments of the disclosure, the EUD 106 may be a client device, such as a mainframe computer, desktop computer, and so on.

The remote server 108 is any computer system that serves at least some data and/or functionality to the computer 102. The remote server 108 may be controlled and used by the same entity that operates the computer 102. The remote server 108 represents the machine(s) that collect and store helpful and useful data for use by various computers, such as the computer 102. For example, in a hypothetical case where the computer 102 is designed and programmed to provide a recommendation based on historical data, then this historical data may be provided to the computer 102 from the remote database 108A of the remote server 108.

The public cloud 110 is any computer system available for use by multiple entities that provides on-demand availability of computer system resources and/or various computer capabilities, especially data storage (cloud storage) and computing power, without direct active management by the user. Cloud computing typically leverages the sharing of resources to achieve coherence and economies of scale. The direct and active management of the computing resources of the public cloud 110 is performed by the computer hardware and/or software of the cloud orchestration module 110B. The computing resources provided by the public cloud 110 are typically implemented by virtual computing environments that run on various computers making up the computers of the host physical machine set 110C, which is the universe of physical computers in and/or available to the public cloud 110. The virtual computing environments (VCEs) typically take the form of virtual machines from the virtual machine set 110D and/or containers from the container set 110E. It is understood that these VCEs may be stored as images and may be transferred among and between the various physical machine hosts, either as images or after the instantiation of the VCE. The cloud orchestration module 110B manages the transfer and storage of images, deploys new instantiations of VCEs, and manages active instantiations of VCE deployments. The gateway 110A is the collection of computer software, hardware, and firmware that allows the public cloud 110 to communicate through the WAN 104.

Some further explanation of virtualized computing environments (VCEs) will now be provided. VCEs can be stored as "images". A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in the containers. A computer program running on an ordinary operating system can utilize the resources of that computer, such as connected devices, files and folders, network shares, CPU power, and quantifiable hardware capabilities. However, programs running inside a container can only use the contents of the container and devices assigned to the container, a feature which is known as containerization.

The private cloud 112 is similar to the public cloud 110, except that the computing resources are only available for use by a single enterprise. While the private cloud 112 is shown as being in communication with the WAN 104, in various embodiments of the disclosure, a private cloud may be disconnected from the internet entirely and only accessible through a local/private network. A hybrid cloud is a composition of multiple clouds of different types (for example, private, community, or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment of the disclosure, the public cloud 110 and the private cloud 112 are both part of a larger hybrid cloud.

FIG. 2 is a diagram that illustrates an environment for optimization of cached persistent volumes (PVs) in containerized environments, in accordance with an embodiment of the disclosure. FIG. 2 is explained in conjunction with elements from FIG. 1. With reference to FIG. 2, there is shown a diagram of a network environment 200. The network environment 200 includes a computer system 202 (may be referred to as a system 202 hereinafter), an on-premises edge environment 204 (may be referred to as an edge environment 204), and a first environment 206. The edge environment 204 hosts an application 204A. A plurality of cached persistent volumes (PVs) 208 is stored in the first environment 206. The plurality of cached PVs 208 includes a first cached PV 208A, a second cached PV 208B, and a third cached PV 208C. The system 202 is configured to identify a set of cached PVs 210A from the plurality of cached PVs 208. The system 202 is further configured to receive a first request 204A1 for provisioning a specific cached PV 210B from the application 204A hosted on the edge environment 204. The network environment 200 further includes a second environment 212, a server 214, and a user device 216. The user device 216 is associated with a user 218. The network environment 200 further includes the WAN 104 of FIG. 1. In an embodiment of the disclosure, the user device 216 is an exemplary embodiment of the EUD 106. Similarly, the computer system 202 is an exemplary embodiment of the computer 102 in FIG. 1.

The system 202 includes suitable logic, circuitry, code, and/or interfaces that are configured to optimize the provisioning of the cached persistent volumes (PVs) stored in the first environment 206. The system 202 is configured to receive the first request 204A1 for provisioning the specific cached persistent volume (PV) 210B within the first environment 206. The first request 204A1 includes at least one specific directory (e.g. dataset1/animals/dogs) associated with at least a first dataset (e.g. dogs). In an embodiment, the first request 204A1 is further associated with obtaining the at least first dataset (e.g. dogs) from the second environment 212 into the specific cached PV 210B, for the application 204A. The system 202 is further configured to identify the set of cached PVs 210A from the plurality of cached PVs 208 based on: a presence of a match between the first request 204A1 and the set of cached PVs 210A, and a sharing status (e.g. sharedcache) associated with each cached PV of the plurality of cached PVs 208. As illustrated in FIG. 2, since the sharing status of each cached PV of the set of cached PVs 210A is enabled (sharedcache: true), hence the system 202 identified the set of cached PVs 210A. The sharing status indicates the availability of the respective cached PV of the plurality of cached PVs 208 for allocation. The system 202 is further configured to determine a set of directory paths (e.g. contentfilter: dataset1/animals/cats) associated with the set of cached PVs 210A. Each directory path of the set of directory paths is indicative of at least a second dataset (e.g. dogs, cats, parrots, or the like) stored within each cached PV of the set of cached PVs 210A in the first environment 206. Each cached PV of the set of cached PVs 210A is associated with at least one directory path of the set of directory paths. The system 202 is further configured to generate a set of matching scores for the set of cached PVs 210A based on the determined set of directory paths and the at least one specific directory path associated with the first request 204A1. Each matching score of the set of matching scores is indicative of a degree of the match between the first request and a respective cached PV of the set of cached PVs 210A. The system 202 is further configured to control an allocation of a cached PV (e.g. first cached PV 208A) of the set of cached PVs 210A to the application 204A based on the set of matching scores.

Examples of the system 202 include but are not limited to, a server, a computing device, a virtual computing device, a mainframe machine, a computer workstation, a smartphone, a cellular phone, a mobile phone, a gaming device, or a consumer electronic (CE) device. By way of example, and not by limitation, the system 202 may be embodied as a cloud-based service, a cloud-based application, a cloud-based platform, a remote server-based service, a remote server-based application, a remote server-based platform, or a virtual computing system.

The edge environment 204 includes suitable logic, circuitry, code, and/or interfaces that are configured to perform fast processing and real-time data analytics by bringing computational resources closer to the user devices (e.g. user device 216). The edge environment 204 performs fast data processing, which is critical for applications that needs less latency and quick decision-making. By processing data locally, the edge environment 204 reduces the time taken to send data to a central server and receive a response, thereby enhancing user experience and operational efficiency. Additionally, the edge environment 204 reduces the amount of data that needs to be transmitted over the WAN 104, which helps in reducing the network bandwidth and lowering the operational costs.

In an embodiment, the edge environment 204 is configured to host the application 204A. In an embodiment, the application 204A includes suitable logic and/or code that is designed to perform specific tasks or functions, which can range from web services to data processing tools. Specifically, the application 204A may be built using various programming languages and frameworks, and the application 204A relies on specific dependencies and configurations to operate effectively. It may be noted that there can be a plurality of applications running on the edge environment 204 however only a single application is shown in FIG. 2. By way of example, and not by limitation, the application 204A could be a website that serves dynamic content, a database management system, a microservice that handles user authentication, and the like.

However, the edge environment 204 is often limited in terms of memory and computational resources. Devices such as IoT sensors, mobile phones, and edge servers typically have finite processing power and storage capacity. As a result, the edge devices cannot retain the data generated or processed in real-time. Due to limited memory and limited computational resources, the use of caching mechanisms to store frequently accessed data temporarily becomes very critical. Caching allows the edge environment 204 to quickly retrieve the critical information without needing to reprocess or re-fetch it from a more distant source, thus optimizing performance and resource utilization. Examples of the edge environment 204 include but are not limited to, a mobile device, an IOT device, an edge server, and the like.

The first environment 206, associated with the edge environment 204, includes suitable logic, code, circuitry, and/or interfaces that may be configured to store the cached PVs (including the plurality of cached PVs 208 that may be currently allocated to the plurality of applications running on the edge environment 204, and various cached PVs (such as the specific cached PV 210B) that are not yet allocated to any application). The first environment 206 addresses the limitations of the edge environment 204 by providing a caching layer that stores the cached persistent volumes (PVs).

In an embodiment, the first environment 206 operates by obtaining data from the second environment 212 (e.g. central cloud storage), which serves as a comprehensive repository for a vast amount of information. Once the data is retrieved from the second environment 212, the first environment 206 stores the data in the cached PVs, making the data readily accessible for the edge environment 204. This process significantly enhances the speed at which data can be accessed and processed locally, as the plurality of applications running on the edge environment 204 can quickly reference the cached data instead of repeatedly querying the second environment 212. However, in case the requests are for the same data (e.g. dataset1/animals/dogs), then continuously obtaining the same data from the first environment 206 can be time-consuming and inefficient. Each request to the first environment increases the latency, which can slow down operations and degrade user experience. Examples of the first environment may include, but are not limited to, content delivery networks (CDNs), local database caching, video streaming services, and the like.

In an embodiment, each cached PV of the plurality of cached PVs 208 corresponds to a piece of storage within the first environment 206, that may be configured to store the data needed by the plurality of applications running on the edge environment 204. In an embodiment, each cached PV of the plurality of cached PVs 208 corresponds to the PVs within the first environment 206 that have been currently allocated to the plurality of applications running on the edge environment 204. Each cached PV of the plurality of cached PVs 208 may further be associated with a volume handle that uniquely identifies the respective PV within the first environment 206. The volume handle is a parameter that uniquely identifies the cached PV in the first environment 206 and helps in managing the cached PV and accessing data from the cached PV. In an embodiment, each cached PV of the plurality of cached PVs has a sharing status parameter (e.g. sharedcache), that indicates whether the application associated with the respective cached PV intends to share the data stored within the respective cached PV with the plurality of cached PVs allocated to the plurality of applications running on the edge environment. In an embodiment, the system 202 is configured to validate the requests using security parameters before sharing the data with the plurality of applications to maintain integrity. In an embodiment, each cached PV of the plurality of cached PVs also has at least one directory path parameter (e.g. contentfilter) that indicates that data which is stored inside the respective cached PV (e.g. dataset1/animals/dogs indicates that the data associated with dogs is stored inside the first cached PV.

In an embodiment, the system 202 may be configured to identify the set of cached PVs 210A from the plurality of cached PVs 208 based on the presence of the match between the first request 204A1 and each cached PV of the set of cached PVs 210A, and the sharing status. The set of cached PVs 210A includes the cached PVs from the plurality of cached PVs 208 that have their sharing status as enabled (sharedcache as true) and there is the presence of the match between the at least one specific directory path (e.g. dataset1/animals/dogs) associated with the first request 204A1 and the directory path (e.g. dataset1/animals) associated with the respective cached PV of the set of cached PVs 210A. The specific cached PV 210B may be one of the cached PVs that had not been allocated yet, to any of the plurality of applications running on the edge environment 204. The system 202 may receive the first request 204A1 for the provisioning of the specific cached PV 210B since that has not been allocated yet.

It may be noted that a person with ordinary skill in the art will understand that the scope of the disclosure may not be limited to the implementation of the edge environment 204 and the first environment 206 as two separate entities. In some embodiments, functionalities of the first environment 206 can be incorporated in its entirety or at least partially in the edge environment 204, without a departure from the scope of the disclosure.

The second environment 212 includes suitable logic, circuitry, code, and/or interfaces that may be configured to perform comprehensive data management and analysis. The second environment 212 encompasses a vast array of scalable and flexible computing resources, storage, and services hosted in remote data centers, accessible over the WAN 104. The second environment 212 is designed for long-term data storage, complex processing tasks, and running applications that need significant computational power. The second environment 212 serves as a centralized hub where data from various sources can be aggregated, analyzed, and stored for future use. Unlike the edge environment 204, which is constrained by resources and memory limitations, the second environment 212 can accommodate vast amounts of data and complex processing tasks without the same resource restrictions. The second environment 212 acts as a centralized hub for data storage, analytics, and application hosting, enabling organizations to manage and analyze large datasets efficiently. Examples of the second environment 212 include but are not limited to, a central cloud storage, a data warehouse, a data lake, and the like.

The server 214 includes suitable logic, circuitry, interfaces, and/or code that stores the set of instructions. The server 214 can be implemented as a cloud server and may execute operations through web applications, cloud applications, HTTP requests, repository operations, file transfer, and the like. Various implementations of the server 214 include but are not limited to, a database server, a file server, a web server, a media server, an application server, a mainframe server, or a cloud computing server. In an embodiment, the server 214 is implemented as a plurality of distributed cloud-based resources by use of several technologies that are well known to those ordinarily skilled in the art. A person with ordinary skill in the art will understand that the scope of the disclosure may not be limited to the implementation of the server 214 and the system 202 as two separate entities. In certain embodiments, the functionalities of the server 214 can be incorporated in its entirety or at least partially in the system 202, without a departure from the scope of the disclosure.

The user device 216 includes suitable logic, circuitry, and/or interfaces that are configured to execute one or more tasks within the network environment 200. The user device 216 performs the one or more tasks such as receiving data, processing the data, and transmitting the data. In an embodiment, the system 202 is configured to receive the first request 204A1 from the user device 216. In an alternate embodiment, the system 202 is configured to render a message on the user device 216 upon the allocation of the cached PV. The message may be, for example, "The PV has been allocated to the application successfully. Now you can access the data". A person with ordinary skill in the art will understand that the scope of the disclosure may not be limited to the implementation of the user device 216, the system 202, and the edge environment 204 as three separate entities. In some embodiments, the edge environment 204 can be the user device 216. Similarly, in some embodiments, the functionalities of the user device 216 can be incorporated in its entirety or at least partially in the system 202, without a departure from the scope of the disclosure. Examples of the user device 216 include one but are not limited to, a smartphone, a cellular phone, a mobile phone, a consumer electronic (CE) device, an Internet of Things (IoT) device, a computing device, a mainframe machine, a server, a computer workstation, or the like.

In operation, the system 202 is configured to receive the first request 204A1 for the provision of the specific cached PV 210B (a new cached PV that has not been allocated yet, to any of the applications) within the first environment 206. In an embodiment, the system 202 is configured to receive the first request 204A1 from the application 204A running on the edge environment 204. In an alternate embodiment, the system 202 is configured to receive the first request 204A1 from the user device 216. In an embodiment, the first request 204A1 includes the at least one specific directory associated with the at least first dataset. The first request 204A1 is associated with the retrieval of the at least first dataset from the second environment 212. In an embodiment, the system 202 is configured to receive the first request 204A1 in the form of a cached persistent volume claim (PVC) (e.g. YAML (yet another markup language) file), in which the parameters (contentfilter) and the sharing status (sharecontent) are defined. Details about the first request reception operation are provided, for example, in FIG. 3A.

By way of example, and not by limitation, the system 202 receives the first request 204A1 for provisioning the specific cached PV 210B and pre-populating the specific cached PV 210B with the data (dataset1/animals/dogs) from the second environment 212, for the application 204A. The first request 204A1 includes at least one specific directory path parameter (contentfilter: dataset1/animals/dogs) that indicates the at least first dataset (dogs) that needs to be obtained from the second environment, for the application 204A.

Thereafter, the system 202 is configured to identify the set of cached PVs 210A from the plurality of cached PVs 208 based on the presence of the match between the first request 204A1 and each cached PV of the set of cached PVs 210A, and the sharing status. The sharing status indicates the availability of the respective cached PV of the plurality of cached PVs 208 for allocation. The set of cached PVs 210A includes the cached PVs from the plurality of cached PVs 208 that have their sharing status as enabled (sharedcache as true) and there is the presence of the match between the at least one specific directory path (e.g. dataset1/animals/dogs) associated with the first request 204A1 and the directory path (e.g. dataset1/animals) associated with the respective cached PV of the set of cached PVs 210A. In an embodiment, the system 202 may utilize a pattern-matching operation to determine the presence of the match between the first request 204A1 and each cached PV of the set of cached PVs 210A in order to identify the set of cached PVs 210A.

By way of example, the system 202 determines the presence of the match between the first request (dataset1/animals/dogs), the first cached PV 208A (dataset1/animals/ dogs and dataset1/animals/cats), and the second cached PV 208B (dataset1/animals) since there is a presence of a match between the directory paths of the first cached PV 208A, the second cached PV 208B, and the specific directory path of the first request 204A1. Also, the sharing status of the first cached PV and the second cached PV is enabled. Hence, the system 202 includes the first cached PV and the second cached PV in the set of cached PVs 210A. Further, since the sharing status of the third cached PV 208C is disabled, the system 202 excludes the third cached PV 208C from the set of cached PVs 210A.

Further, the system 202 is configured to determine the set of directory paths associated with the identified set of cached PVs 210A. In an embodiment, each directory path of the set of directory paths is indicative of the at least second dataset stored within each cached PV of the set of cached PVs 210A. Each cached PV of the set of cached PVs 210A is associated with the at least one directory path of the set of directory paths. The set of directory paths refers to the specific locations or addresses within the second environment 212 that indicate where files, folders, and datasets are stored, which can be helpful in terms of obtaining the data from the second environment 212. The set of directory paths provides a structured way to navigate through the hierarchy of directories (or folders) to obtain the data from the second environment 212. In an embodiment, the system 202 is configured to parse the r parameter associated with each cached PV of the set of cached PVs 210A to determine the set of directory paths.

By way of example and not by limitation, the parses the contentfilter parameter to identify that the directory paths associated with the first cached PV are "dataset1/animals/dogs" and "dataset1/animals/cats". The directory path "dataset1/animals/dogs" is indicative of the dataset "dogs" and the directory path "dataset1/animals/cats" is indicative of the dataset "cats". Similarly, the system 202 determines that the directory path associated with the second cached PV is "dataset1/animals". The directory path "dataset1/animals" is indicative of the dataset "animals".

Thereafter, the system 202 may be configured to generate the set of matching scores for the set of cached PVs 210A based on the determined set of directory paths and the at least one specific directory path associated with the first request 204A1. In an embodiment, the system 202 may be configured to similarly apply the pattern-matching operation to the determined set of directory paths and the at least one directory path to determine a degree of the match between the set of directory paths and the at least one directory path. In an embodiment, each matching score of the set of matching scores indicates the degree of the match between the first request 204A1 and the respective cached PV of the set of cached PVs 210A. In an embodiment, the system 202 is configured to generate the set of matching scores based on a count of strings or the count of characters that matches between each directory path of the set of directory paths and the at least one specific directory path. For example, for "dataset1/animals/dogs" and "dataset1/animals", the matching score would be "17" since the count of strings matching between them is 17. Similarly, for "dataset1/animals/dogs" and "dataset1/animals/dogs", the matching score would be "21".

By way of example and not by limitation, the system 202 applies the pattern-matching operation to generate the set of matching scores for the first cached PV 208A and the second cached PV 208B. The first cached PV is associated with two directory paths but only one of them matches with the received first request, which is "dataset1/animals/dogs". For the first directory path "dataset1/animals/dogs", the system 202 generates the matching score of "21" since 21 characters match with the specific directory path of the first request "dataset1/animals/dogs". Similarly, for the second cached PV 208B, the directory path is "dataset1/animals", the system 202 generates a matching score of "17" since only 17 characters are matched with the specific directory path of the first request "dataset1/animals/dogs".

To this end, the system 202 may be configured to control the allocation of the cached PV of the set of cached PVs 210A to the application 204A based on the generated set of matching scores. In an embodiment, the system 202 may be configured to first identify the cached PV from the set of cached PVs 210A based on the set of matching scores and then control the allocation of the identified cached PV to the application 204A. The matching score associated with the identified cached PV is highest among the generated set of matching scores. For the allocation of the identified cached PV, the system 202 generates a specific volume handle for the first request 204A1 and maps the specific volume handle for the first request 204A1 with the existing volume handle of the identified cached PV. The volume handle will use the existing directory path associated with the at least second dataset stored within identified cached PV, which can be further used for various tasks without the need to obtain the data from the second environment 212.

For example, the system 202 maps the volume handle like volumeHandle="2;2;clusterID;fileSystemID< >;volName;existing_pv_directory_path" in the YAML file of the first request (the cached persistent volume claim (PVC)). By way of example, and not by limitation, the system determines that the matching score associated with the first cached PV 208A (dataset1/animals/dogs) is highest among the generated set of matching scores associated with the set of cached PVs. Hence, the system 202 controls the allocation of the first cached PV 208A to the application 204A. The system 202 similarly maps the volume handle of the cached PV to the first request 204A1.

Instead of allocating the specific cached PV (a new cached PV) within the first environment 206, the system 202 controls the allocation of the existing cached PV (the cached PV of the set of cached PVs) that has the highest matching score, among the generated set of matching score, with the first request 204A1. By allocating the existing cached PV, the system 202 eliminates the need for pre-populating the new cached PV and obtaining the at least first dataset from the second environment, for the allocation. Hence, the disclosed computer system reduces the processing time for the allocation of the cached PV by eliminating the need for obtaining the first dataset from the second environment 212. The disclosed computer system further reduces the wastage of the storage resources within the first environment 206 by eliminating the need for allocating the new cached PV. The disclosed computer system further reduces the bandwidth of the WAN 104 by eliminating the need for obtaining the at least first dataset from the second environment 212.

Figure 3A:
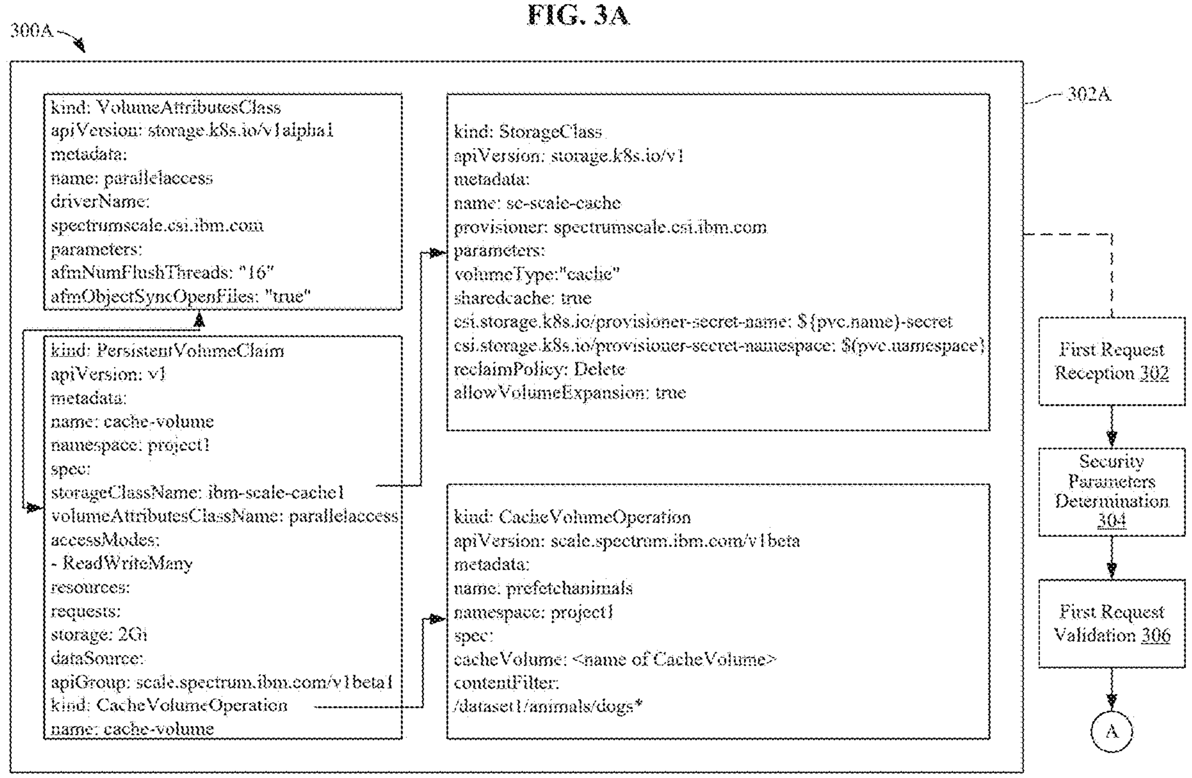
FIG. 3A is a diagram that illustrates exemplary operations for validation of cached persistent volume claims (PVCs) for optimization of cached persistent volumes (PVs) within containerized environments, in accordance with an embodiment of the disclosure.

FIG. 3A is a diagram that illustrates exemplary operations for validation of cached persistent volume claims (PVCs) for optimization of cached persistent volumes (PVs) within containerized environments, in accordance with an embodiment of the disclosure. FIG. 3A is explained in conjunction with elements from FIG. 1 and FIG. 2. With reference to FIG. 3A, there is shown the block diagram 300A that illustrates exemplary operations from 302 to 306, as described herein. With reference to FIG. 3A, there is further shown a first request 302A. The exemplary operations illustrated in the block diagram 300A start at 302 and are performed by any computing system, apparatus, or device, such as by the computer 102 of FIG. 1 or by the computer system 202 of FIG. 2. Although illustrated with discrete blocks, the exemplary operations associated with one or more blocks of the block diagram 300A can be divided into additional blocks, combined into fewer blocks, or eliminated, depending on the implementation. The first request 302A is an exemplary embodiment of the first request 204A1 of FIG. 2.

At 302, a first request reception operation is performed. In the first request reception operation, the system 202 may be configured to receive the first request 302A for the provision of the specific cached PV 210B (a new cached PV that has not been allocated yet, to any of the applications) within the first environment 206. In an embodiment, the system 202 is configured to receive the first request 302A from the application 204A running on the edge environment 204. In an alternate embodiment, the system 202 is configured to receive the first request 302A from the user device 216. In an embodiment, the first request 302A includes the at least one specific directory associated with the at least first dataset. The first request 302A is associated with the retrieval of the at least first dataset from the second environment 212. As illustrated in FIG. 3, the system 202 is configured to receive the first request 302Ain the form of a cached persistent volume claim (PVC). The cached PVC is a request by a user for storage within the first environment 206 (the cache). In an embodiment, the cached PVC corresponds to a YAML (yet another markup language) file, in which the parameters such as (contentfilter) and the sharing status (sharecontent) are defined. As illustrated in FIG. 3, various parameters related to the amount of storage needed by the user, and some security credential parameters are also defined in the YAML file. In an embodiment, the contentfilter parameter indicates the data that needs to be prepopulated within the specific cached PV. In case no values are mentioned in the contentfilter parameter, then the entire data will be pre-populated. The YAML file may further include some tunable parameters such as afmNumFlushThreads and afmObjectSyncOpenFiles which are optional for the user.

In an alternate embodiment, the system 202 may be configured to render a prompt associated with the YAML file on the user device 216 for the user 218. In the prompt, the user 218 will only be asked to provide critical parameters such as the sharing status (sharecontent), the data that the user 218 wants to be pre-populated in the specific cached PV 210B (contentfilter), the amount of storage that the user wants to be allocated, security parameters and the like. In an embodiment, the system 202 may be configured to automatically populate, in the prompt, various parameters that remain constant across the requests for allocation of the cached PVs, and various parameters that are optional for the user 218 like the afmNumFlushThreads and the afmObjectSyncOpenFiles. In an embodiment, the system 202 may further allow the user 218 to change the various optional parameters in case the user 218 intends to change the optional parameters in the prompt.

By way of example, and not by limitation, the system 202 receives the first request 302A for provisioning the specific cached PV 210B and pre-populating the specific cached PV 210B with the data (dataset1/animals/dogs) from the second environment 212, for the application 204A. The first request 302A includes at least one specific directory path parameter (contentfilter: dataset1/animals/dogs) that indicates the at least first dataset (dogs) that needs to be obtained from the second environment, for the application 204A.

At 304, a security parameters determination operation is performed. In the security parameters determination operation, the system 202 may be configured to determine a first set of security parameters associated with the first request 302A and a second set of security parameters associated with the first environment 206. Each security parameter of the first set of security parameters may correspond to a first specific attribute in the first request 302A that may be utilized for authorization of the first request 302A, and for an allocation of a cached PV to the first request 302A, in the first environment 206. Each security parameter of the second set of security parameters may correspond to a second specific attribute, that must be present in the first request 302A for authorization, and for allocation of a cached PV within the first environment 206. In an embodiment, the system 202 may be configured to parse the first request 302A in order to determine the first set of security parameters associated with the first request 302A. In an embodiment, each security parameter of the second set of security parameters may be provided (or defined) by an administrator of the first environment 206.

At 306, a first request validation operation is performed. In the first request validation operation, the system 202 may be configured to validate the first request 302A based on the determined first set of security parameters and the determined second set of security parameters. In an embodiment, the system 202 may be configured to authenticate and authorize the first request 302A based on the first set of security parameters and the second set of security parameters. In an embodiment, the system 202 may be configured to compare the determined first set of security parameters and the determined second set of security parameters. In case each security parameter of the determined first set of security parameters (present in the first request 302A) is equal to a respective security parameter of the determined second set of security parameters (defined by the administrator), then the system 202 may be configured to authenticate and authorize the first request 302A for the allocation of the cached PV within the first environment 206.

In an embodiment, the system 202 may be further configured to control the allocation of the cached PV of the set of cached PVs to the application 204A based on the validation (the authentication and the authorization) of the first request 302A. In case the first request 302A fails the validation (each security parameter of the first set of security parameters is not equal to the respective security parameter of the second set of security parameters), the system 202 may be configured to notify the user about the failure that the first request does not meet the security parameters that are needed for the authorization of the first request 302A and the allocation of the cached PV. In case the first request 302A passes the validation (each security parameter of the first set of security parameters is equal to the respective security parameter of the second set of security parameters), the system 202 may be configured to control the allocation of the cached PV to the application 204A. Details about the control of allocation of the cached PV are provided, for example, in FIG. 3B.

Figure 3B:
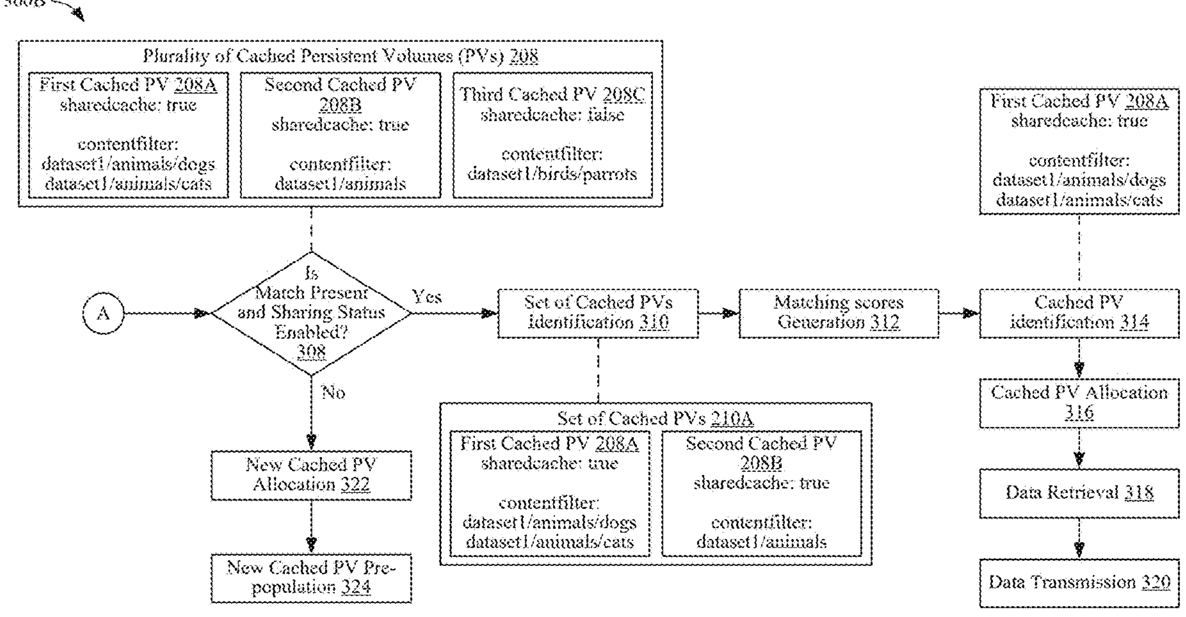
FIG. 3B is a diagram that illustrates exemplary operations for optimization of cached persistent volumes (PVs) within containerized environments, in accordance with an embodiment of the disclosure.

FIG. 3B is a diagram that illustrates exemplary operations for the optimization of cached persistent volumes (PVs) within containerized environments, in accordance with an embodiment of the disclosure. FIG. 3B is explained in conjunction with elements from FIG. 1, FIG. 2, and FIG. 3A. With reference to FIG. 3B, there is shown the block diagram 300B that illustrates exemplary operations from 308 to 324, as described herein. With reference to FIG. 3B, there is further shown the plurality of cached PVs 208 and the identified set of cached PVs 210A. The exemplary operations illustrated in the block diagram 300B start at 308 and are performed by any computing system, apparatus, or device, such as by the computer 102 of FIG. 1 or by the computer system 202 of FIG. 2. Although illustrated with discrete blocks, the exemplary operations associated with one or more blocks of the block diagram 300B can be divided into additional blocks, combined into fewer blocks, or eliminated, depending on the implementation.

At 308, it is determined that a match is present between the first request 302A and each cached PV of the plurality of cached PVs 208, and the sharing status is enabled. In an embodiment, the system 202 may be configured to parse the YAML file associated with each cached PV of the plurality of cached PVs in order to determine whether the sharing status (sharecontent) associated with the respective cached PV of the plurality of cached PVs is enabled or disabled. In case the sharing status associated with the respective cached PV is enabled, the sharing status indicates that the respective cached PV is available to be shared and allocated. In case the sharing status associated with the respective cached PV is disabled, the sharing status indicates that the respective cached PV is unavailable to be shared and allocated. In an embodiment, the system 202 may further apply a pattern-matching operation to each cached PV of the plurality of cached PVs 208 and the first request in order to determine the presence of the match. Specifically, the system 202 may be configured to apply the pattern-matching operation to the at least one specific directory path (dataset1/animals/dogs) associated with the first request 302A and each directory path of a plurality of directory paths (contentfilter) associated with the plurality of cached PVs, in order to determine the presence of the match. In case a portion of the at least one specific directory path is present in a respective directory path of the plurality of directory paths, the presence of the match between the first request and the respective cached PV is determined.

By way of example, and not by limitation, the system 202 determines the presence of the match between the first request 302A (dataset1/animals/dogs), the first cached PV 208A (dataset1/animals/dogs and dataset1/animals/cats) and the second cached PV 208B (dataset1/animals). The system 202 further determines that the sharing status of each of the first cached PV 208A and the second cached PV is enabled (sharecontent: true). The system 202 similarly determines that the sharing status associated with the third cached PV 208C is disabled (sharecontent: false), and there is an absence of the match.

Based on the determination of the presence of the match and the determination that the sharing status is enabled, the control of operations proceeds to 310 to identify the set of cached PVs 210A, otherwise, the control of operations proceeds to 322 to allocate a new cached PV to the application 204A. In case the system 202 identifies the set of cached PVs 210A that matches with the first request 302A, then the system 202 maps the first request 302A with one of the set of cached PVs 210A, otherwise the system 202 allocates the new cached PV to the application 204A since no existing cached PV had the data needed to fulfill the first request 302A.

At 310, a set of cached PVs identification operation is performed. In the set of cached PVs identification operation, the system 202 may be configured to identify the set of cached PVs 210A from the plurality of cached PVs 208 based on the determination of the presence of the match and the determination that the sharing status is enabled. The set of cached PVs 210A includes the cached PVs from the plurality of cached PVs 208 that have their sharing status as enabled (sharedcache as true) and there is the presence of the match between the at least one specific directory path (e.g. dataset1/animals/dogs) associated with the first request 204A1 and the directory path (e.g. dataset1/animals) associated with the respective cached PV of the set of cached PVs 210A.

By way of example, the system 202 determines the presence of the match between the first request (dataset1/animals/dogs), the first cached PV 208A (dataset1/animals/dogs and dataset1/animals/cats), and the second cached PV 208B (dataset1/animals) since there is a presence of a match between the directory paths of the first cached PV 208A, the second cached PV 208B, and the specific directory path of the first request 302A. Also, the sharing status of the first cached PV and the second cached PV is enabled. Hence, the system 202 includes the first cached PV and the second cached PV in the set of cached PVs 210A. Further, since the sharing status of the third cached PV 208C is disabled, the system 202 excludes the third cached PV 208C from the set of cached PVs 210A.

At 312, a matching scores generation operation is performed. In the matching scores generation operation, the system 202 may be configured to generate the set of matching scores associated with the identified set of cached PVs 210A. In an embodiment, each matching score of the set of matching scores indicates the degree of the match between the first request 302A and the respective cached PV of the set of cached PVs 210A. Firstly, the system 202 may be configured to parse the YAML files corresponding to the identified set of cached PVs 210A to determine the set of directory paths (contentfilter). Thereafter, the system 202 may be configured to apply the pattern-matching operation to each directory path of the determined set of directory paths and the at least one specific directory path associated with the first request 302A. Then, the system 202 may be configured to generate the set of matching scores based on the count of strings or the count of characters that match between each directory path of the set of directory paths and the at least one specific directory path. For example, for "dataset1/animals/dogs" and "dataset1/animals", the matching score would be "17" since the count of strings matching between them is 17. Similarly, for "dataset1/animals/dogs" and "dataset1/animals/dogs", the matching score would be "21". Details about the pattern-matching operation are provided, for example, in FIG. 4B.

By way of example and not by limitation, the system 202 applies the pattern-matching operation to generate the set of matching scores for the first cached PV 208A and the second cached PV 208B. The first cached PV is associated with two directory paths but only one of them matches with the received first request, which is "dataset1/animals/dogs". For the first directory path "dataset1/animals/dogs", the system 202 generates the matching score of "21" since 21 characters match with the specific directory path of the first request "dataset1/animals/dogs". Similarly, for the second cached PV 208B, the directory path is "dataset1/animals", the system 202 generates a matching score of "17" since only 17 characters are matched with the specific directory path of the first request "dataset1/animals/dogs".

At 314, a cached PV identification operation is performed. In the cached PV identification operation, the system 202 may be configured to identify the cached PV from the set of cached PVs 210A based on the generated set of matching scores. In an embodiment, the matching score associated with the identified cached PV is highest among the generated set of matching scores. In this manner, the system 202 selects the most suitable cached PV from the set of cached PVs 210A that has the highest probability of having the data that is needed by the application 204A. By way of example, and not by limitation, the system determines that the matching score associated with the first cached PV 208A (dataset1/animals/dogs and dataset1/animals/cats) is highest among the generated set of matching scores associated with the set of cached PVs. Hence, the system 202 identifies the first cached PV 208A for the application 204A.

At 316, a cached PV allocation operation is performed. In the cached PV allocation operation, the system 202 controls the allocation of the identified cached PV to the application 204A. In an embodiment, the system 202 may be configured to map the first request 302A with the identified cached PV. For the allocation, the system 202 may be configured to map the at least one specific directory path (contentfilter) of the first request 302A (the new PVC creation request) with the directory path associated with the specific directory path of the identified cached PV. In an embodiment, the system 202 may be configured to generate a specific volume handle for the first request 302A and map the specific volume handle for the first request 302A with the existing volume handle of the identified cached PV. The volume handle will use the existing directory path associated with the at least second dataset stored within the identified cached PV, which can be further used for various tasks without the need to obtain the data from the second environment 212. For example, the system 202 maps the volume handle like volumeHandle="2;2;clusterID;fileSystemID< >;volName;existing_pv_directory_path" in the YAML file of the first request (the cached persistent volume claim (PVC)).

At 318, a data retrieval operation is performed. In the data retrieval operation, the system 202 is configured to obtain the at least first dataset from the allocated cached PV (or the identified cached PV). In case only a partial amount of data is present in the identified cached PV, then the system 202 may be configured to obtain a first portion (the partial amount of data) of the at least first dataset from the identified cached PV based on the degree of the match, and transmit the first portion of the at least first dataset to the application 204A so that the application can at least start the functioning (e.g. can start training its models). The system 202 may be further configured to obtain a second portion of the at least first dataset (the rest of the data) from the second environment 212, based on the degree of the match. For example, in case the first request is for the data (dataset1/animals/dogs, and dataset1/animals/rabbits), and the existing cached PVs have only the data (dataset1/animals/dogs), then the system 202 may map the existing cached PV to the first request, obtain the dog's dataset from the existing cached PV, and obtain the rabbit's dataset from the second environment. Hence, the system 202 maps the existing cached PVs even if the partial amount of the data is present within the existing cached PVs, which helps in optimizing the storage resources, and further reduces the bandwidth of the WAN 104 as the amount of the data that needs to be obtained from the second environment 212 is very less. By way of example, and not by limitation, since the first request 302A was only for the (dataset1/animals/dogs), and the data was present in the first cached PV 208A, hence the system 202 obtains the dog's dataset from the first cached PV 208A.

At 320, a data transmission operation is performed. In the data transmission operation, the system 202 may be configured to transmit the obtained at least first dataset to the application 204A. In case only the partial amount of the data is present, the system 202 may be configured to transmit the obtained first portion to the application 204A so that the application can at least start the functioning (e.g. can start training its models). In an embodiment, the system 202 may further be configured to transmit the obtained second portion to the application in case the partial amount of the data is present. By way of example, and not by limitation, since the first request 302A was only for the (dataset1/animals/dogs), and the data was present in the first cached PV 208A, hence the system 202 transmits the obtained dog's dataset, obtained from the first cached PV 208A.

At 322, a new cached PV allocation operation is performed. In the new cached PV allocation operation, the system 202 may be configured to control an allocation of a new cached PV (the specific cached PV 210B, which has not been allocated to any of the applications yet) to the application 204A, based on the determination of the absence of the match and the determination that the sharing status is disabled. In an embodiment, the system 202 may be configured to control the allocation of the specific cached PV 210B to the application 204A, in case there is no existing cached PV in the plurality of cached PVs 208, which matches with the first request 302A, and has the sharing status enabled (sharedcache: true). In case the first request is associated with such a dataset, that is not present in any of the existing cached PVs, then the system 202 controls the allocation of the specific cached PV 210B to the application 204A. In that case, the system 202 will generate a new volume handle for the specific cached PV 210B instead of mapping it with the volume handle of the existing cached PV. By way of example, and not by limitation, in case the first request is associated with a dataset say (dataset2/plants/flowers), then the system 202 may allocate a new cached PV for the first request if the dataset2/plants/flowers data is absent in any of the existing cached PVs.

At 324, a new-cached PV pre-population operation is performed. In the new cached PV pre-population operation, the system 202 may be configured to pre-populate the new cached PV (the allocated specific cached PV 210B) with the data from the second environment 212. In an embodiment, the system 202 may be configured to obtain the data from the second environment and pre-populate the new cached PV with the data, in case the data needed by the first request is not present in any of the existing cached PVs as discussed above. By way of example, and not by limitation, in case the first request is associated with dataset2/plants/flowers, then the system 202 may obtain the flowers dataset from the second environment 212 and pre-populate the new cached PV with the flowers dataset.

Figure 4A:
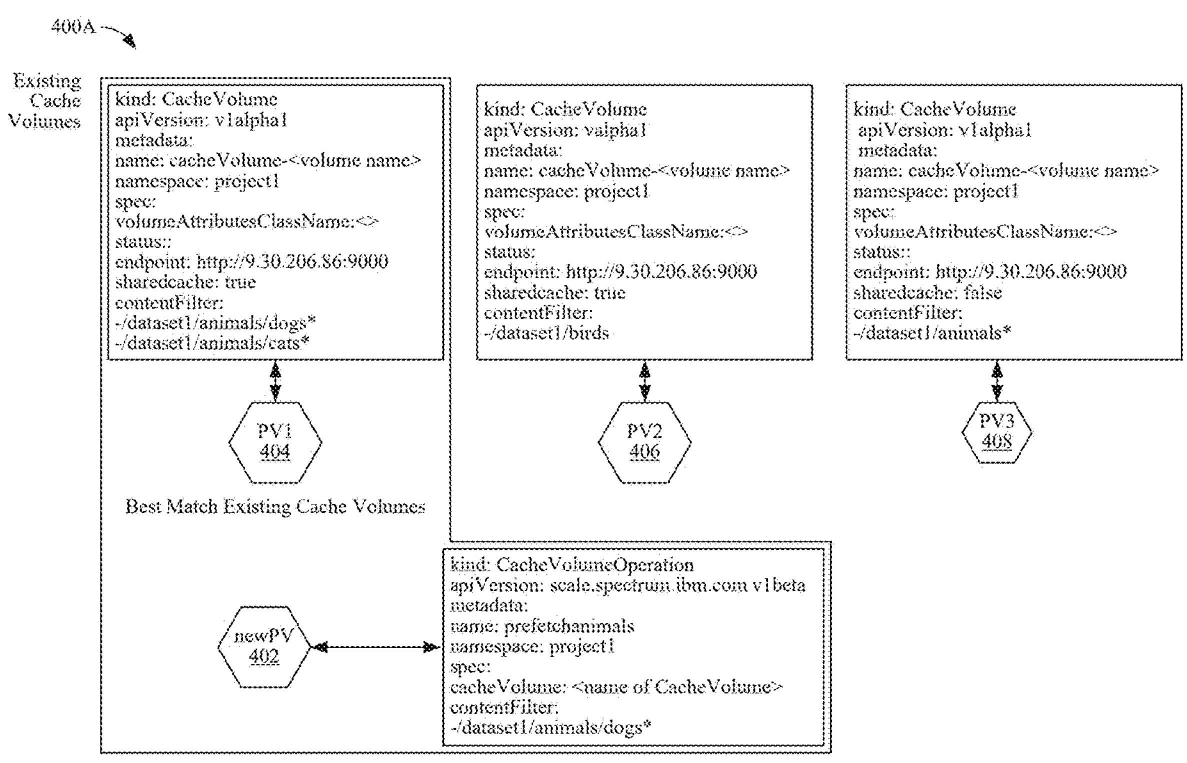
FIG. 4A is a diagram that illustrates an exemplary scenario for the identification of an existing cached persistent volume (PV) for optimization of cached persistent volumes (PVs) in containerized environments, in accordance with an embodiment of the disclosure.
Figure 4B:
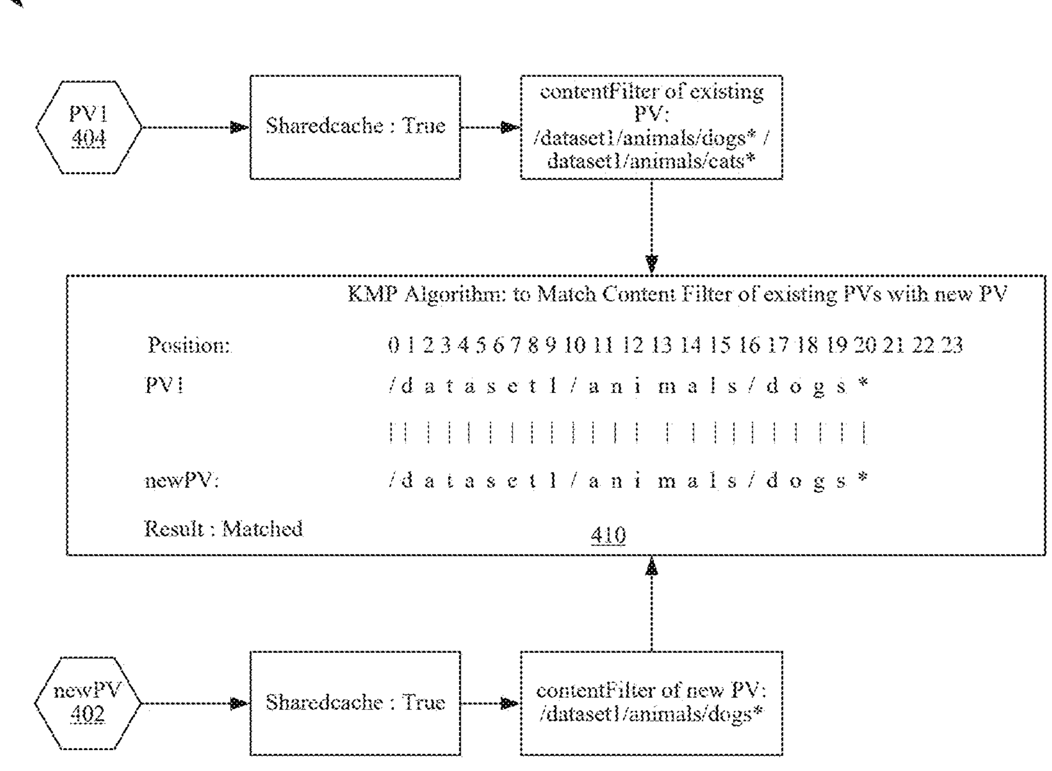
FIG. 4B is a diagram that illustrates an exemplary pattern-matching operation for optimization of cached persistent volumes (PVs) in containerized environments, in accordance with an embodiment of the disclosure.

FIG. 4A is a diagram that illustrates an exemplary scenario for the identification of an existing cached persistent volume (PV) for optimization of cached persistent volumes (PVs) in containerized environments, in accordance with an embodiment of the disclosure. FIG. 4A is explained in conjunction with FIG. 1, FIG. 2, FIG. 3A and FIG. 3B. With reference to FIG. 4A, there is further shown the first request 302A for provisioning a new cached PV 402 within the first environment 206. With reference to FIG. 4B, there is further shown a plurality of cached PVs that includes a first-cached PV (PV1 404), a second-cached PV (PV2 406), and a third-cached PV (PV3 408). Each cached persistent volume (PV) of the plurality of cached PVs (PV1 404, the PV2 406, and the PV3 408) is an exemplary embodiment of the plurality of cached PVs 208 of FIG. 2. Similarly, the new cached PV 402 is an exemplary embodiment of the specific cached PV 210B of FIG. 2.

As illustrated in FIG. 4A, the system 202 is configured to receive the first request 302A for the provision of the new cached PV 402 within the first environment 206 in the form of the YAML file as discussed above. The first request 302A includes the at least one specific directory path (e.g. dataset1/animals/dogs) associated with at least the first dataset (e.g. dogs). The first request 302A is associated with obtaining the at least first dataset (e.g. dogs) from the second environment 212. Each cached PV of the PV1 404, the PV2 406, and the PV3 corresponds to the existing cached PVs that are currently allocated to the plurality of applications running on the edge environment 204. Details about the first request reception operation, are provided, for example, in FIG. 3A.

As discussed above, upon the reception of the first request 302A, the system 202 may be configured to identify the set of cached PVs 210A from the plurality of cached PVs 208 based on the presence of the match between the first request 302A and each cached PV of the set of cached PVs 210A, and the sharing status (sharecontent) associated with each cached PV of the plurality of cached PVs 208. The set of cached PVs 210A includes the PVs from the plurality of cached PVs 208, those have the sharing status enabled (sharecontent: true), and there is the presence of the match between the first request 302A and each cached PV of the set of cached PVs 210A.

For example, there is a presence of the match between the PV1 404 and the first request 302A associated with the new cached PV 402, and the sharing status associated with the PV1 is also enabled (sharecontent: true). The system 202 identifies the PV1 404 in the identified set of cached PVs. Since the PV3 408 has the sharing status as disabled, the system 202 excludes the PV3 408 from the identified set of cached PVs 210A. Details about the set of cached PVs identification operation are provided, for example, in FIG. 3B.

Further, the system 202 may be configured to generate the set of matching scores associated with the identified set of cached PVs based on the degree of match between the at least one specific directory path associated with the first request 204A1 and the respective directory path of the set of directory paths associated with the identified set of cached PVs 210A. The system 202 may be configured to apply the pattern-matching operation to the at least one specific directory path and each directory path of the set of directory paths to determine the count of characters or the count of the strings that matches between the at least one specific directory path and the respective directory path of the set of directory paths. In an embodiment, the system 202 may be further configured to generate the set of matching scores based on the count of the strings or the count of the characters.

For example, the count of characters that match between the directory path associated with the PV1 404 (dataset1/animals/dogs and dataset1/animals/cats) and the first request (dataset1/animals/cats) is 21, hence the system 202 generates the matching score of 21 for the PV1 404. Similarly, the count of the characters that match between the directory path associated with the PV2 406 (dataset1/birds) and the first request (dataset1/animals/dogs) is 8, hence the system 202 generates the matching score of 8. Since the PV3 408 is not a part of the identified set of cached PVs, the system 202 does not generate a matching score for the PV3 408. Details about the set of matching scores generation operation are provided, for example, in FIG. 3B.

As discussed above, the system 202 may further be configured to identify the cached PV from the set of cached PVs 210A based on the generated set of matching scores. The matching score associated with the identified cached PV is highest among the generated set of matching scores. The system 202 may further be configured to control the allocation of the identified cached PV to the application 204A. For example, as illustrated in FIG. 4A, since the matching score of the PV1 404 was highest among the generated set of matching scores, the system 202 allocates the PV1 404 to the first request 302A. Details about the cached PV identification and the cached PV allocation operation, are provided, for example, in FIG. 3B.

FIG. 4B is a diagram that illustrates an exemplary pattern-matching operation for optimization of cached persistent volumes (PVs) in containerized environments, in accordance with an embodiment of the disclosure. FIG. 4B is explained in conjunction with FIG. 1, FIG. 2, FIG. 3A, FIG. 3B, and FIG. 4A. With reference to FIG. 4B, there is shown the first request 302A for the new cached PV 402 and the PV1 404. With reference to FIG. 4B, there is further shown a block 410 that illustrates the working of the exemplary pattern-matching operation, for the generation of matching scores.

As illustrated in FIG. 4B, the block 410 describes the working of the exemplary pattern-matching operation. In an embodiment, the system 202 may be configured to apply the exemplary pattern-matching operation to the at least one specific directory path associated with the first request 302A and each directory path of the set of directory paths to generate the set of matching scores. In an embodiment, the exemplary pattern-matching operation counts the number of characters or the number of strings that match between the at least one specific directory path associated with the first request 302A and each directory path of the set of directory paths. In an embodiment, each matching score of the set of matching scores indicates the degree of the match between the first request 302A and the respective cached PV. For example, the count of characters that match between the directory path associated with the PV1 404 (dataset1/animals/dogs and dataset1/animals/cats) and the first request (dataset1/animals/cats) is 21, hence the system 202 generates the matching score of 21 for the PV1 404.

Examples of the exemplary pattern-matching operations may include but are not limited to a Knuth-Morris-Pratt (KMP) operation, a Rabin-Karp operation, a Boyer-Moore operation, a Naive String-matching operation, and the like. It may be noted that only the working of the Knuth-Morris-Pratt (KMP) operation has been shown in FIG. 4B, but a person of ordinary skill in the art will understand that the scope of the disclosure may not be limited to the KMP operation. The system 202 may similarly apply the Rabin-Karp operation, the Boyer-Moore operation, the Naive String-matching operation, and various pattern-matching operations for the determination of the presence of the match and the generation of the set of matching scores. Details about the Knuth-Morris-Pratt (KMP) operation, the Rabin-Karp operation, the Boyer-Moore operation, and the Naive String-matching operation have been omitted for the sake of brevity.

FIG. 5 is a diagram that illustrates a flowchart of an exemplary method for optimization of cached persistent volumes (PVs) in containerized environments, in accordance with an embodiment of the disclosure. FIG. 5 is explained in conjunction with elements from FIG. 1, FIG. 2, FIG. 3A, FIG. 3B, FIG. 4A, and FIG. 4B. With reference to FIG. 5, there is shown a flowchart 500. The operations of the exemplary method may be executed by any computing system, for example, by the computer 102 of FIG. 1 or the computer system 202 of FIG. 2. The operations of the flowchart 500 may start at 502.

At 502, a cached persistent volume claim (PVC) creation request with pre-populated data enabled with contentfilter is received. In an embodiment, the system 202 may be configured to receive the cached PVC creation request with pre-populated data enabled with contentfilter. The cached PVC creation request corresponds to the first request 302A (cached PVC claim in the form of YAML file) that includes the at least one specific directory path (contentfilter), and the first request 302A is associated with obtaining the at least first dataset (pre-populate data) from the second environment 212. Details about the first request reception operation are provided, for example, in FIG. 3A.

At 504, PVC parameters associated with the PVC creation request (the first request 302A) are extracted by a container storage interface (CSI). In an embodiment, the system 202 may be configured to control the CSI to extract the PVC parameters associated with the first request 302A. The CSI corresponds to a standardized interface that includes suitable logic, circuitry, and/or code to manage storage resources in a consistent manner within containerized environments. In an embodiment, the PVC parameters include the determined first set of security parameters associated with the first request 302A and the determined second set of security parameters associated with the first environment 206, which are utilized to authenticate and authorize the PVC creation request for the allocation of the cached PV within the first environment 206. In an embodiment, the PVC parameters may further include the at least one specific directory path (contentfilter) associated with the first request 302A that may be utilized to identify the cached PV for the PVC creation request. Details about the security parameters determination operation and the at least one specific directory path associated with the first request are provided, for example, in FIG. 3A.

At 506, existing cached PVCs/PVs are searched for identification of the cached PV for the cached PVC creation request. In an embodiment, the system 202 may be configured to search the existing cached PVCs/PVs for the identification of the cached PV for the cached PVC creation request. As discussed above, the plurality of cached PVs 208 corresponds to the existing cached PVs/PVCs that have been allocated to the plurality of applications and are prepopulated with some amount of the data. In an embodiment, the system 202 may be configured to search through the plurality of cached PVs 208 for the identification of the cached PV based on the at least one specific directory path associated with the first request 302A. In an embodiment, the system 202 may be configured to search for the set of cached PVs 210A that have their sharing status enabled (sharedcache: true). Details about the plurality of cached PVs and the identification of the set of cached PVs are provided, for example, in FIG. 2 and FIG. 3B.

At 508, a pattern-matching operation (e.g. a KMP operation) is applied to match new PVC contentfilter parameters with the existing cached PVCs/PVs. In an embodiment, the system 202 may be configured to apply the pattern-matching operation (e.g. the KMP operation) to the plurality of directory paths associated with the plurality of cached PVs (existing cached PVCs/PVs) and the at least one specific directory path (contentfilter) associated with the first request 302A (new PVC creation request). Details about the pattern-matching operation are provided, for example, in FIG. 3B and FIG. 4B.

At 510, it is determined that a match is present (or found) between the new PVC request and the existing cached PV/PVCs, based on the application of the pattern-matching operation. In an embodiment, the system may be configured to determine the presence of the match between the new PVC request (the first request 302A) and the plurality of cached PVs 208 (the existing cached PV/PVCs) based on the application of the pattern-matching operation. In an embodiment, the system 202 may be further configured to identify the set of cached PVs 210A and the plurality of cached PVs 208 based on the presence of the match. The system 202 may be further configured to generate the set of matching scores for the identified set of cached PVs and then identify the cached PV from the set of cached PVs based on the generated set of matching scores. Each matching score of the set of matching scores is indicative of the degree of the match. The matching score of the identified cached PV is highest among the set of matching scores. Details about the set of cached PVs identification, the set of matching scores generation, and the cached PV identification operations are provided, for example, in FIG. 3B. Based on the determination that the match is present, and the identification of the cached PV, the control of operations proceeds to 512 otherwise the control of operations proceeds to 516.

At 512, the new cached PVC data path is mapped with the matched (or identified) cached PVC data path, and the volume handle is created based on the presence of the match. In an embodiment, the system 202 may be configured to map the new cached PVC data path with the identified cached PVC data path and then create the volume handle for the new cached PVC. In an embodiment, the system 202 may be configured to control the allocation of the identified cached PV to the application 204A. For the allocation, the system 202 may be configured to map the at least one specific directory path (contentfilter) of the first request 302A (the new PVC creation request) with the directory path associated with the specific directory path of the identified cached PV. The system 202 may further be configured to generate the volume handle accordingly. Details about the allocation of the cached PV and the volume handle creation are provided, for example, in FIG. 3B.

At 514, a meta-directory, with the new PVC/PV name, is created at the storage cluster to prevent the deletion of data associated with the allocated cached PV. In an embodiment, the system 202 may be configured to generate a meta-directory for the prevention of the data associated with the allocated cached PV. The meta-directory may include a counter variable that may be indicative of the number of applications accessing the data (the at least second dataset). The system 202 may be configured to prevent the deletion of the data (the at least second dataset) within the allocated cached PV based on the counter variable. Details about the meta-directory are further provided, for example, in FIG. 6A.

At 516, a prefetch mechanism is utilized to fetch the data (the at least first dataset) from the second environment 212 based on the determination that the match is absent between the cached PVC creation request and the existing cached PVCs/PVs. In an embodiment, the system 202 may be configured to utilize the prefetch mechanism to fetch the data (the at least first dataset) from the second environment 212 based on the determination that the match is absent between the cached PVC creation request and the existing cached PVCs/PVs. Details about the data retrieval, from the second environment 212, for pre-populating the specific cached PV 210B, are provided, for example, in FIG. 3B.

At 518, a new cached PVC/PV is created with prefetched data. In an embodiment, the system 202 may be configured to generate the new cached PV (the specific cached PV 210B) with the prefetched data based on the determination that the match is absent. In an embodiment, the system 202 may be configured to control an allocation of the specific cached PV 210B (new cached PV) to the application 204A based on the determination that the match is absent and then prepopulate the specific cached PV with the prefetched data (the at least first dataset) from the second environment 212. Details about the allocation of the specific cached PV 210B are provided, for example, in FIG. 3B.

Figure 6A:
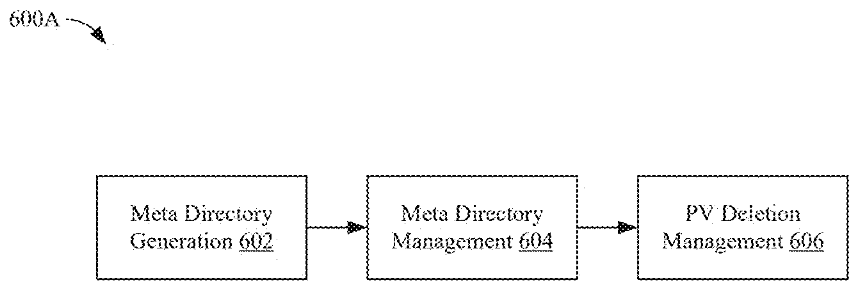
FIG. 6A is a diagram that illustrates exemplary operations for the management of cached PVs using a meta-directory for optimization of cached persistent volumes (PVs) within containerized environments, in accordance with an embodiment of the disclosure.

FIG. 6A is a diagram that illustrates exemplary operations for the management of cached PVs using a meta-directory for optimization of cached persistent volumes (PVs) within containerized environments, in accordance with an embodiment of the disclosure. FIG. 6A is explained in conjunction with elements from FIG. 1, FIG. 2, FIG. 3A, FIG. 3B, FIG. 4A, FIG. 4B, and FIG. 5. With reference to FIG. 6A, there is shown the block diagram 600A that illustrates exemplary operations from 602 to 606, as described herein. The exemplary operations illustrated in the block diagram 600A start at 602 and are performed by any computing system, apparatus, or device, such as by the computer 102 of FIG. 1 or by the computer system 202 of FIG. 2. Although illustrated with discrete blocks, the exemplary operations associated with one or more blocks of the block diagram 600A can be divided into additional blocks, combined into fewer blocks, or eliminated, depending on the implementation.

At 602, a meta-directory generation operation is performed. In the meta-directory generation operation, the system 202 may be configured to generate the meta-directory associated with the identified cached PV. In an embodiment, the meta-directory may be indicative of one or more applications from the plurality of applications, that may be associated with the identified cached PV (e.g. the application 204A). The meta-directory further indicates the one or more applications that are utilizing the at least second dataset from the identified cached PV. In an embodiment, the system 202 may be configured to generate the meta-directory within the specific directory path associated with the identified cached PV with the name of the identified cached PV. In the meta-directory, the system 202 generates the counter variable that indicates a count of the applications that are associated with the identified cached PV. The initial value of the counter variable is equal to the count of the one or more applications that are accessing the at least second dataset from the identified cached PV. In an embodiment, the system 202 may be configured to similarly generate the meta-directory for each cached PV of the plurality of cached PVs 208 based on the count of the applications that are associated with the respective cached PV. For example, the system 202 generates the meta-directory for the first cached PV 208A.

At 604, a meta-directory management operation is performed. In the meta-directory management operation, the system 202 may be configured to manage the counter variable of the generated meta-directory. In an embodiment, the system 202 may be configured to increment the counter variable by a value of 1, when a new association (e.g. the association with the application 204A) is found, or a new request (e.g. the first request 302A) is mapped with the identified cached PV. For example, when the system 202 maps the first request 302A with the identified cached PV, the system 202 increments the counter variable of the meta-directory associated with the identified cached PV by the value of 1.

In an embodiment, for the optimization of the first environment 206, the system 202 may be configured to similarly decrement the counter variable by the value of 1 based on a reception of a notification from one application of the one or more applications associated with the identified cached PV, the notification indicating that the respective work is done, and the one application does not need the at least second dataset any further. In an alternate embodiment, the system 202 may be configured to decrement the counter variable by the value of 1, in case a time period of the establishment of the association of the one application is greater than a threshold time period. In an embodiment, the system 202 may further be configured to decrement the counter variable by the value of 1, in case a time period from the last timestamp usage of the at least second dataset from the identified second dataset is greater than the threshold time period.

At 606, a PV deletion management operation is performed. In the PV deletion management operation, the system 202 may be configured to control a deletion of the at least second dataset within the identified cached PV based on the meta-directory. In an embodiment, the system 202 may be configured to delete the at least second dataset present within the identified cached PV only in case the value of the counter variable in the meta-directory associated with the identified cached PV is 0. In this manner, the system 202 will prevent the deletion of the at least second dataset until no association is left with the identified cached PV. In an embodiment, the system 202 ensures that the at least second dataset is present within the identified cached PV until the work of each application of the one or more applications, associated with the identified cached PV, is done. For example, the system 202 prevents the deletion of the "dataset1/animals/dogs" within the first cached PV 208A until the value of the counter variable in the meta-directory associated with the first cached PV 208A is 0.

Figure 6B:
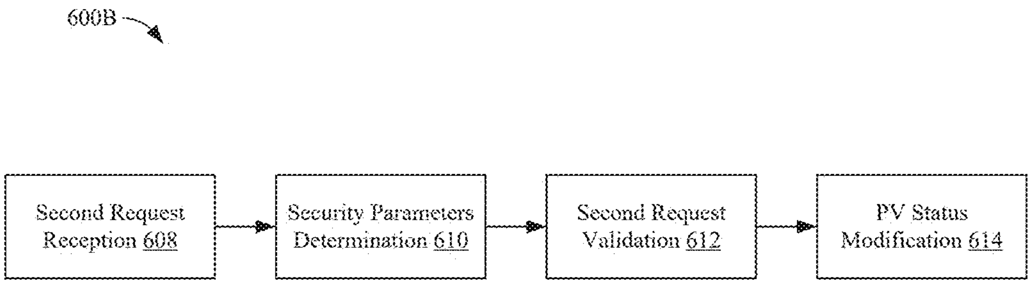
FIG. 6B is a diagram that illustrates exemplary operations for modification of sharing status of existing cached persistent volumes (PVs) for optimization of cached PVs within containerized environments, in accordance with an embodiment of the disclosure.

FIG. 6B is a diagram that illustrates exemplary operations for modification of the sharing status of existing cached persistent volumes (PVs) for optimization of cached PVs within containerized environments, in accordance with an embodiment of the disclosure. FIG. 6B is explained in conjunction with elements from FIG. 1, FIG. 2, FIG. 3A, FIG. 3B, FIG. 4A, FIG. 4B, FIG. 5, and FIG. 6A. With reference to FIG. 6B, there is shown the block diagram 600B that illustrates exemplary operations from 608 to 614, as described herein. The exemplary operations illustrated in the block diagram 600B start at 608 and are performed by any computing system, apparatus, or device, such as by the computer 102 of FIG. 1 or by the computer system 202 of FIG. 2. Although illustrated with discrete blocks, the exemplary operations associated with one or more blocks of the block diagram 600B can be divided into additional blocks, combined into fewer blocks, or eliminated, depending on the implementation.

At 608, a second request reception operation is performed. In the second request reception operation, the system 202 may be configured to receive a second request associated with the modification of the sharing status associated with the plurality of cached PVs 208. In an embodiment, the system 202 may be similarly configured to receive the second request in the form of the YAML file from the plurality of applications associated with the plurality of cached PVs 208. In an alternate embodiment, the system 202 may be configured to receive the second request from the user device 216. In case an application of the plurality of applications, which is accessing the data within the plurality of cached PVs, intends to modify the sharing status (shared-cache) of the cached PV associated with the application, the application may transmit the second request for the modification of the sharing status, and the system 202 may be configured to receive the second request. The modification of the sharing status can be either modifying the sharing status from enabled to disabled, or from disabled to enabled.

For example, the system 202 receives the second request for modification of the sharing status of the third cached PV 208C, the modification request is from disabled to enabled (sharedcache: false to sharedcache: true).

At 610, a security parameters determination operation is performed. In the security parameters determination operation, the system 202 may be configured to determine a first set of security parameters associated with the second request and a second set of security parameters associated with the first environment 206. Each security parameter of the first set of security parameters may correspond to a first specific attribute in the second request that may be utilized for authorization of the second request, and for the modification of the sharing status of the cached PV associated with the second request, in the first environment 206. Each security parameter of the second set of security parameters may correspond to a second specific attribute, that must be present in the second request, for authorization, and for modification of the sharing status of a cached PV within the first environment 206. In an embodiment, the system 202 may be configured to parse the second request in order to determine the first set of security parameters associated with the second request. In an embodiment, each security parameter of the second set of security parameters may be provided (or defined) by an administrator of the first environment 206.

At 612, a second request validation operation is performed. In the second request validation operation, the system 202 may be configured to validate the second request based on the determined first set of security parameters and the determined second set of security parameters. In an embodiment, the system 202 may be configured to authenticate and authorize the second request based on the first set of security parameters and the second set of security parameters. In an embodiment, the system 202 may be configured to compare the determined first set of security parameters and the determined second set of security parameters. In case each security parameter of the determined first set of security parameters (present in the second request) is equal to a respective security parameter of the determined second set of security parameters (defined by the administrator), then the system 202 may be configured to authenticate and authorize the second request for the modification of the sharing status associated with the cached PV.

At 614, a PV status modification operation is performed. In the PV status modification operation, the system 202 may be configured to modify the sharing status associated with the plurality of cached PVs 208 based on the authorization (validation) of the second request. In an embodiment, the modification corresponds to one of modifying the sharing status from either disabled to enabled or enabled to disabled. In an embodiment, the system 202 may be configured to modify the sharing status (sharedcache) in the YAML file associated with the identified cached PV. For example, the system 202 modifies the sharing status of the third cached PV 208C from disabled to enabled (sharedcache: true).

Figure 7:
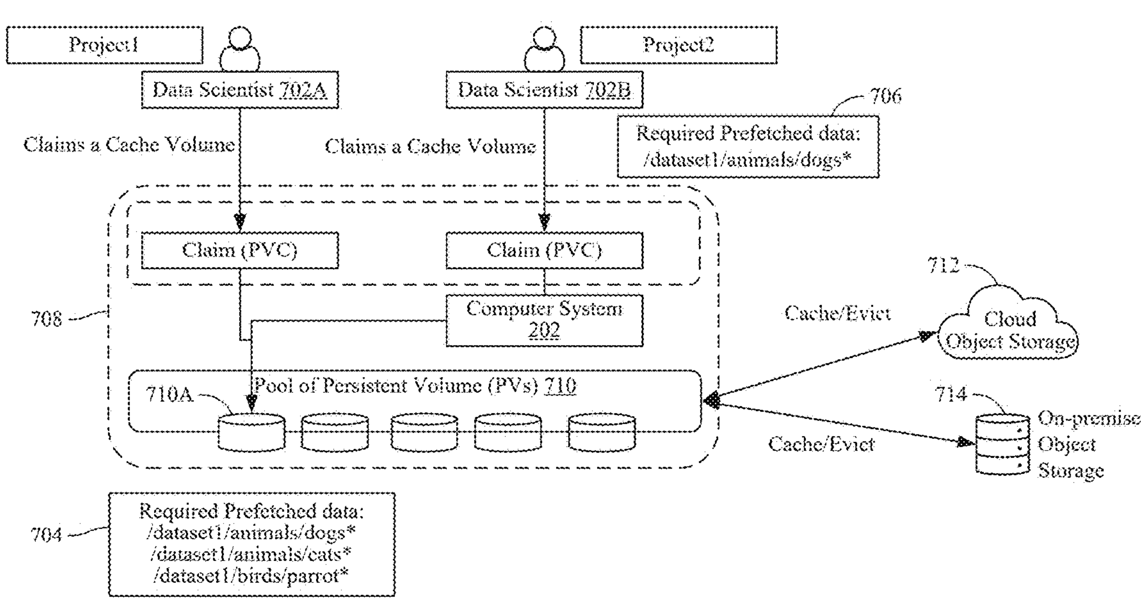
FIG. 7 is a diagram that illustrates an exemplary scenario for optimization of cached persistent volumes (PVs) in containerized environments, in accordance with an embodiment of the disclosure.

FIG. 7 is a diagram that illustrates an exemplary scenario for optimization of cached persistent volumes (PVs) in containerized environments, in accordance with an embodiment of the disclosure. FIG. 7 is explained in conjunction with FIG. 1, FIG. 2, FIG. 3A, FIG. 3B, FIG. 4A, FIG. 4B, FIG. 5, FIG. 6A, and FIG. 6B. With reference to FIG. 7, there is shown a first data scientist 702A, and a second data scientist 702B. With reference to FIG. 7, there is further shown a first environment 708. A pool of persistent volumes (PVs) 710 is deployed within the first environment 708. The pool of PVs 710 includes a PV 710A allocated to the first data scientist 702A. With reference to FIG. 7, there is further shown a cloud object storage 712 and an on-premise object storage 714. The first environment 708 is an exemplary embodiment of the first environment 206 of FIG. 2. Similarly, the on-premises object storage 714 and the cloud object storage 712 are exemplary embodiments of the edge environment 204 and the second environment 212, respectively, of FIG. 2. The pool of PVs 710 is an exemplary embodiment of the plurality of cached PVs 208 of FIG. 2.

With reference to FIG. 7, the first data scientist 702A is working on project 1. The first data scientist 702A requests for first prefetched data 704 and has the PV 710A allocated for the project 1. The first data scientist requests for the first prefetched data 704 in the form of the PVC request as discussed above. The first prefetched data 704 includes three directory paths indicative of three datasets stored within the PV 710A (e.g. dataset1/animals/dogs, dataset1/animals/cats, and dataset1/birds/parrot).

With reference to FIG. 7, the system 202 receives the request for second prefetched data 706 from the second data scientist 702B, working on project 2. In an embodiment, the second prefetched data 706 includes the specific directory path (dataset1/animals/dogs) that needs to be obtained from the cloud object storage 712, and a new cached PV needs to be allocated for the second prefetched data 706.

As discussed above in FIG. 5, instead of allocating a new cached PV to the request for the second prefetched data 706, the system 202 firstly checks for an existing cached PV that is currently allocated, has the sharing status enabled and matches the request for the second prefetched data 706. In an embodiment, the system 202 may be configured to apply the pattern-matching operation to the prefetched data associated with the request (dataset1/animals/dogs) and the directory path associated with the existing cached PVs (e.g. the PV 710A dataset1/animals/dogs). The system 202 may further determine the presence of the match based on the application of the pattern-matching operation. The system 202 may further identify a set of existing cached PVs that match the request and have the sharing status enabled. The system 202 may further generate the set of matching scores for the identified set of cached PVs. The system 202 may further identify the existing cached PV from the identified set of cached PVs that best match the request based on the generated set of matching scores. The system 202 may further control an allocation of the identified cached PV for the project 2 of the second data scientist. For example, the system 202 identifies that the PV 710A best matches with the request of the second data scientist 702B, and has the sharing status as enabled, hence the system 202 allocates the PV 710A for the project 2. Details about the pattern-matching operation, the set of cached PVs identification, the set of matching scores generation, the cached PV identification, and the cached PV allocation, are provided, for example, in FIG. 3B, and its corresponding description.

Instead of allocating the new cached PV within the first environment 708, the system 202 controls the allocation of the existing cached PV (PV 710A) that has the highest matching score, among the generated set of matching scores, with the first request 302A. By allocating the existing cached PV, the system 202 eliminates the need for pre-populating the new cached PV and obtaining the at least first dataset from the cloud object storage 712, for the allocation. Hence, the disclosed computer system reduces the processing time for the allocation of the cached PV by eliminating the need for obtaining the first dataset from the cloud object storage 712. The disclosed computer system further reduces the wastage of the storage resources within the first environment 206 by eliminating the need for allocating the new cached PV. The disclosed computer system further reduces the bandwidth of the WAN 104 by eliminating the need for obtaining the at least first dataset from the cloud object storage 712.

Figure 8:
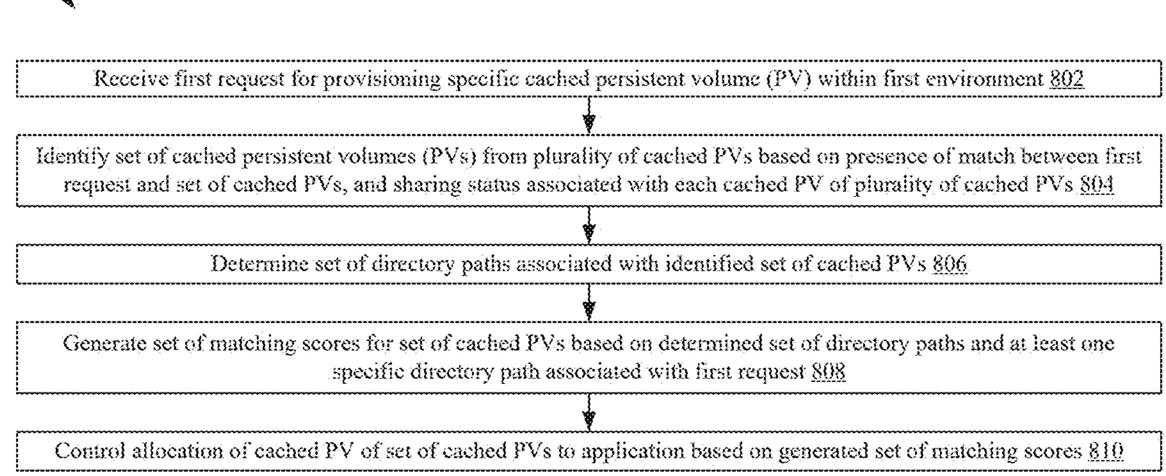
FIG. 8 is a diagram that illustrates a flowchart of a second exemplary method for optimization of cached persistent volumes (PVs) in containerized environments, in accordance with an embodiment of the disclosure.

FIG. 8 is a diagram that illustrates a flowchart of a second exemplary method for the optimization of cached persistent volumes (PVs) in containerized environments, in accordance with an embodiment of the disclosure. FIG. 8 is explained in conjunction with elements from FIG. 1, FIG. 2, FIG. 3A, FIG. 3B, FIG. 4A, FIG. 4B, FIG. 5, FIG. 6A, FIG. 6B, and FIG. 7. With reference to FIG. 8, there is shown a flowchart 800. The operations of the exemplary method may be executed by any computing system, for example, by the computer 102 of FIG. 1 or the computer system 202 of FIG. 2. The operations of the flowchart 800 may start at 802.

At 802, the first request 302A for the provision of the specific cached PV 210B within the first environment 206 is received. In an embodiment of the disclosure, the system 202 is configured to receive the first request 302A for the provision of the specific cached PV 210B (a new cached PV that has not been allocated yet, to any of the applications) within the first environment 206. In an embodiment, the first request 302A includes the at least one specific directory associated with the at least first dataset. The first request 302A is associated with the retrieval of the at least first dataset from the second environment 212.

At 804, the set of cached PVs 210A is identified from the plurality of cached PVs 208 based on the presence of the match between the first request 302A and each cached PV of the set of cached PVs 210A, and the sharing status associated with each cached PV of the plurality of cached PVs 208. In an embodiment of the disclosure, the system 202 is configured to identify the set of cached PVs 210A from the plurality of cached PVs 208 based on the presence of the match between the first request 302A and each cached PV of the set of cached PVs 210A, and the sharing status associated with each cached PV of the plurality of cached PVs 208. The sharing status indicates the availability of the respective cached PV of the plurality of cached PVs 208 for allocation. The plurality of cached PVs 208 is deployed in the first environment 206.

At 806, the set of directory paths associated with the identified set of cached PVs 210A is determined. In an embodiment of the disclosure, the system 202 is configured to determine the set of directory paths associated with the identified set of cached PVs 210A. In an embodiment, each directory path of the set of directory paths is indicative of the at least second dataset stored within each cached PV of the set of cached PVs 210A. Each cached PV of the set of cached PVs 210A is associated with the at least one directory path of the set of directory paths.

At 808, the set of matching scores for the set of cached PVs 210A is generated based on the determined set of directory paths and the at least one specific directory path associated with the first request 302A. In an embodiment of the disclosure, the system 202 is configured to generate the set of matching scores for the set of cached PVs 210A based on the determined set of directory paths and the at least one specific directory path associated with the first request 302A. In an embodiment, each matching score of the set of matching scores indicates the degree of the match between the first request 302A and the respective cached PV of the set of cached PVs 210A.

At 810, the allocation of the cached PV of the set of cached PVs 210A to the application 204A is controlled based on the generated set of matching scores. In an embodiment of the disclosure, the system 202 may be configured to control the allocation of the cached PV of the set of cached PVs 210A to the application 204A based on the generated set of matching scores.

Figure 9:
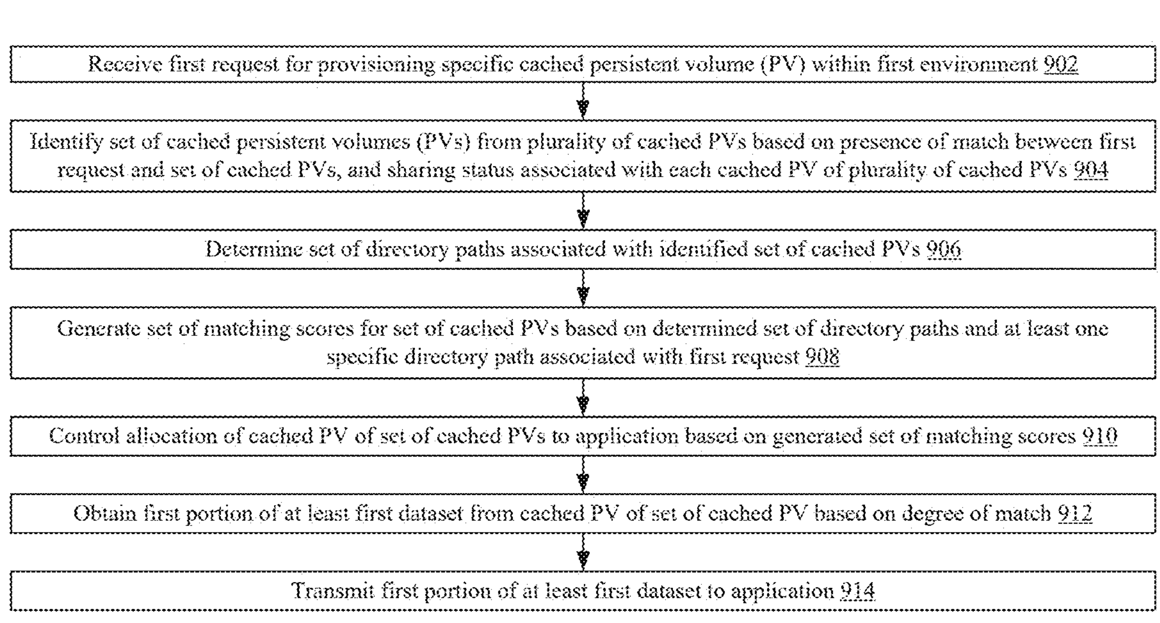
FIG. 9 is a diagram that illustrates a flowchart of a third exemplary method for the optimization of cached persistent volumes (PVs) in containerized environments, in accordance with an embodiment of the disclosure.

FIG. 9 is a diagram that illustrates a flowchart of a third exemplary method for the optimization of cached persistent volumes (PVs) in containerized environments, in accordance with an embodiment of the disclosure. FIG. 9 is explained in conjunction with elements from FIG. 1, FIG. 2, FIG. 3A, FIG. 3B, FIG. 4A, FIG. 4B, FIG. 5, FIG. 6A, FIG. 6B, FIG. 7, and FIG. 8. With reference to FIG. 9, there is shown a flowchart 900. The operations of the exemplary method may be executed by any computing system, for example, by the computer 102 of FIG. 1 or the computer system 202 of FIG. 2. The operations of the flowchart 900 may start at 902.

At 902, the first request 302A for the provision of the specific cached PV 210B within the first environment 206 is received. In an embodiment of the disclosure, the system 202 is configured to receive the first request 302A for the provision of the specific cached PV 210B (a new cached PV that has not been allocated yet, to any of the applications) within the first environment 206. In an embodiment, the first request 302A includes the at least one specific directory associated with the at least first dataset. The first request 302A is associated with the retrieval of the at least first dataset from the second environment 212.

At 904, the set of cached PVs 210A is identified from the plurality of cached PVs 208 based on the presence of the match between the first request 302A and each cached PV of the set of cached PVs 210A, and the sharing status associated with each cached PV of the plurality of cached PVs 208. In an embodiment of the disclosure, the system 202 is configured to identify the set of cached PVs 210A from the plurality of cached PVs 208 based on the presence of the match between the first request 302A and each cached PV of the set of cached PVs 210A, and the sharing status associated with each cached PV of the plurality of cached PVs 208. The sharing status indicates the availability of the respective cached PV of the plurality of cached PVs 208 for allocation. The plurality of cached PVs 208 is deployed in the first environment 206.

At 906, the set of directory paths associated with the identified set of cached PVs 210A is determined. In an embodiment of the disclosure, the system 202 is configured to determine the set of directory paths associated with the identified set of cached PVs 210A. In an embodiment, each directory path of the set of directory paths is indicative of the at least second dataset stored within each cached PV of the set of cached PVs 210A. Each cached PV of the set of cached PVs 210A is associated with the at least one directory path of the set of directory paths.

At 908, the set of matching scores for the set of cached PVs 210A is generated based on the determined set of directory paths and the at least one specific directory path associated with the first request 302A. In an embodiment of the disclosure, the system 202 is configured to generate the set of matching scores for the set of cached PVs 210A based on the determined set of directory paths and the at least one specific directory path associated with the first request 302A. In an embodiment, each matching score of the set of matching scores indicates the degree of the match between the first request 302A and the respective cached PV of the set of cached PVs 210A.

At 910, the allocation of the cached PV of the set of cached PVs 210A to the application 204A is controlled based on the generated set of matching scores. In an embodiment of the disclosure, the system 202 may be configured to control the allocation of the cached PV of the set of cached PVs 210A to the application 204A based on the generated set of matching scores.

At 912, a first portion of the at least first dataset is obtained from the cached PV of the set of cached PVs 210A based on the degree of the match. In an embodiment, the system 202 may be configured to obtain the first portion of the at least first dataset from the cached PV of the set of cached PVs 210A based on the degree of the match.

At 914, the first portion of the at least first dataset is transmitted to the application 204A. In an embodiment, the system 202 is configured to transmit the first portion of the at least first dataset to the application 204A.

The descriptions of the various embodiments of the disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable people of ordinary skill in the art to understand the embodiments disclosed herein.

What is claimed is:

1. A computer-implemented method, comprising:

receiving, by a computer, a first request for provisioning of a specific cached persistent volume (PV) within a first environment, wherein the first request comprises at least one specific directory path associated with a first dataset, and wherein the first request is associated with obtaining the first dataset for an application from a second environment;

identifying, by the computer, a set of cached persistent volumes (PVs) from a plurality of cached PVs based on: a presence of a match between the first request and the set of cached PVs, and a sharing status associated with each cached PV of the plurality of cached PVs, wherein the sharing status indicates an availability of a respective cached PV of the plurality of cached PVs for allocation, and wherein the plurality of cached PVs is deployed within the first environment;

determining, by the computer, a set of directory paths associated with the identified set of cached PVs, wherein each directory path of the set of directory paths is indicative of a second dataset stored within each cached PV of the set of cached PVs in the first environment, and wherein each cached PV of the identified set of cached PVs is associated with at least one directory path of the set of directory paths;

generating, by the computer, a set of matching scores for the set of cached PVs based on the determined set of directory paths and the at least one specific directory path associated with the first request, wherein each matching score of the set of matching scores is indicative of a degree of the match between the first request and a respective cached PV of the set of cached PVs; and controlling, by the computer, an allocation of a cached PV of the set of cached PVs to the application based on the generated set of matching scores.

2. The computer-implemented method of claim 1, further comprising:

identifying, by the computer, the cached PV from the set of cached PVs based on the generated set of matching scores, wherein a matching score associated with the identified cached PV is highest among the generated set of matching scores, and wherein the specific cached PV is excluded from the set of cached PVs; and controlling, by the computer, the allocation of the identified cached PV to the application.

3. The computer-implemented method of claim 2, further comprising:

generating, by the computer, a meta-directory indicative of one or more applications associated with the identified cached PV, wherein the application is included in the one or more applications; and controlling, by the computer, a deletion of the second dataset within the identified cached PV based on the meta-directory.

4. The computer-implemented method of claim 2, further comprising:

obtaining, by the computer, a first portion of the first dataset from the identified cached PV based on the degree of the match; and transmitting, by the computer, the first portion of the first dataset to the application.

5. The computer-implemented method of claim 4, further comprising:

obtaining, by the computer, a second portion of the first dataset from the second environment based on the degree of the match, wherein the second portion is different from the first portion; and transmitting, by the computer, the second portion of the first dataset to the application.

6. The computer-implemented method of claim 1, wherein the sharing status associated with each cached PV of the identified set of cached PVs is enabled.

7. The computer-implemented method of claim 1, further comprising:

determining, by the computer, a plurality of directory paths associated with the plurality of cached PVs, wherein the set of directory paths is included in the plurality of directory paths, and wherein the specific cached PV is excluded from the plurality of cached PVs;

applying, by the computer, a pattern-matching operation to the plurality of directory paths and the at least one specific directory path associated with the first request;

determining, by the computer, the presence of the match between each cached PV of the set of cached PVs and the first request based on the application of the pattern-matching operation to the plurality of directory paths and the at least one specific directory path associated with the first request; and identifying, by the computer, the set of cached PVs from the plurality of cached PVs based on the determination of the presence of the match.

8. The computer-implemented method of claim 1, further comprising:

determining, by the computer, a first set of security parameters associated with the first request;

determining, by the computer, a second set of security parameters associated with the first environment;

authorizing, by the computer, the first request based on the first set of security parameters and the second set of security parameters, wherein the authorization comprises comparing the first set of security parameters with the second set of security parameters; and controlling, by the computer, the allocation of the cached PV of the set of cached PVs to the application based on the authorization.

9. The computer-implemented method of claim 1, further comprising:

receiving, by the computer, a second request associated with a modification of the sharing status;

determining, by the computer, a first set of security parameters associated with the received second request;

determining, by the computer, a second set of security parameters associated with the first environment;

authorizing, by the computer, the received second request based on the first set of security parameters and the second set of security parameters, wherein the authorization comprises comparing the first set of security parameters with the second set of security parameters; and modifying, by the computer, the sharing status based on the authorization, wherein the modification corresponds to one of modifying the sharing status from disabled to enabled or modifying the sharing status from enabled to disabled.

10. The computer-implemented method of claim 1, further comprising:

applying, by the computer, a pattern-matching operation to the determined set of directory paths and the at least one specific directory path associated with the first request; and generating, by the computer, the set of matching scores based on the application of the pattern-matching operation to the determined set of directory paths and the at least one specific directory path associated with the first request.

11. A computer system, comprising:

a processor set;

one or more computer-readable storage media; and program instructions stored on the one or more computer-readable storage media, the program instructions executable by the processor set to cause the processor set to:

receive a first request for a provision of a specific cached persistent volume (PV) within a first environment, wherein the first request comprises at least one specific directory path associated with at least a first dataset, and wherein the first request is associated with a retrieval of the at least first dataset for an application from a second environment;

identify a set of cached persistent volumes (PVs) from a plurality of cached PVs based on: a presence of a match between the first request and the set of cached PVs, and a sharing status associated with each cached PV of the plurality of cached PVs, wherein the sharing status indicates an availability of a respective cached PV of the plurality of cached PVs for allocation, and wherein the plurality of cached PVs is deployed within the first environment;

determine a set of directory paths associated with the identified set of cached PVs, wherein each directory path of the set of directory paths is indicative of at least a second dataset stored within each cached PV of the set of cached PVs in the first environment, and wherein each cached PV of the identified set of cached PVs is associated with at least one directory path of the set of directory paths;

generate a set of matching scores for the set of cached PVs based on the determined set of directory paths and the at least one specific directory path associated with the first request, wherein each matching score of the set of matching scores is indicative of a degree of the match between the first request and a respective cached PV of the set of cached PVs;

control an allocation of a cached PV of the set of cached PVs to the application based on the generated set of matching scores;

obtain a first portion of the at least first dataset from the cached PV of the set of cached PVs based on the degree of the match; and transmit the first portion of the at least first dataset to the application.

12. The computer system of claim 11, wherein the program instructions further cause the processor set to:

identify the cached PV from the set of cached PVs based on the generated set of matching scores, wherein a matching score associated with the identified cached PV is highest among the generated set of matching scores, and wherein the specific cached PV is excluded from the set of cached PVs; and control the allocation of the identified cached PV to the application.

13. The computer system of claim 12, wherein the program instructions further cause the processor set to:

generate a meta-directory indicative of one or more applications associated with the identified cached PV, wherein the application is included in the one or more applications; and control a deletion of the at least second dataset within the identified cached PV based on the meta-directory.

14. The computer system of claim 11, wherein the program instructions further cause the processor set to:

obtain a second portion of the at least first dataset from the second environment based on the degree of the match, wherein the second portion is different from the first portion; and transmit the second portion of the at least first dataset to the application.

15. The computer system of claim 11, wherein the program instructions further cause the processor set to:

determine a plurality of directory paths associated with the plurality of cached PVs, wherein the set of directory paths is included in the plurality of directory paths, and wherein the specific cached PV is excluded from the plurality of cached PVs;

apply a pattern-matching operation to the plurality of directory paths and the at least one specific directory path associated with the first request;

determine the presence of the match between each cached PV of the set of cached PVs and the first request based on the application of the pattern-matching operation to the plurality of directory paths and the at least one specific directory path associated with the first request; and identify the set of cached PVs from the plurality of cached PVs based on the determination of the presence of the match.

16. The computer system of claim 11, wherein the sharing status associated with each cached PV of the identified set of cached PVs is enabled.

17. The computer system of claim 11, wherein the program instructions further cause the processor set to:

determine a first set of security parameters associated with the first request;

determine a second set of security parameters associated with the first environment;

authorize the first request based on the first set of security parameters and the second set of security parameters, wherein the authorization is based on a comparison of the first set of security parameters and the second set of security parameters; and control the allocation of the cached PV of the set of cached PVs to the application based on the authorization.

18. The computer system of claim 11, wherein the program instructions further cause the processor set to:

receive a second request associated with a modification of the sharing status;

determine a first set of security parameters associated with the second request;

determine a second set of security parameters associated with the first environment;

authorize the second request based on the first set of security parameters and the second set of security parameters, wherein the authorization is based on a comparison of the first set of security parameters and the second set of security parameters; and modify the sharing status based on the authorization, wherein the modification corresponds to one of modifying the sharing status from disabled to enabled or modifying the sharing status from enabled to disabled.

19. The computer system of claim 11, wherein the program instructions further cause the processor set to:

apply a pattern-matching operation to the determined set of directory paths and the at least one specific directory path associated with the first request; and generate the set of matching scores based on the application of the pattern-matching operation to the determined set of directory paths and the at least one specific directory path associated with the first request.

20. A computer-program product for controlling an allocation of a cached persistent volume (PV) to an application, the computer-program product comprising:

one or more computer-readable storage media; and program instructions stored on the one or more computer-readable storage media to perform operations comprising:

receiving a first request for provisioning of a specific cached PV within a first environment, wherein the first request comprises at least one specific directory path associated with a first dataset, and wherein the first request is associated with a retrieval of the first dataset for the application from a second environment;

identifying a set of cached persistent volumes (PVs) from a plurality of cached PVs based on: a presence of a match between the first request and the set of cached PVs, and a sharing status associated with each cached PV of the plurality of cached PVs, wherein the sharing status indicates an availability of a respective cached PV of the plurality of cached PVs for allocation, and wherein the plurality of cached PVs is deployed within the first environment;

determining a set of directory paths associated with the identified set of cached PVs, wherein each directory path of the set of directory paths is indicative of a second dataset stored within each cached PV of the set of cached PVs in the first environment, and wherein each cached PV of the identified set of cached PVs is associated with at least one directory path of the set of directory paths;

generating a set of matching scores for the set of cached PVs based on the determined set of directory paths and the at least one specific directory path associated with the first request, wherein each matching score of the set of matching scores is indicative of a degree of the match between the first request and a respective cached PV of the set of cached PVs;

identifying a cached PV from the set of cached PVs based on the generated set of matching scores, wherein a matching score associated with the identified cached PV is highest among the generated set of matching scores, and wherein the specific cached PV is excluded from the set of cached PVs; and controlling the allocation of the identified cached PV to the application based on the generated set of matching scores.

* * * * *